(12) United States Patent
Aoki

(10) Patent No.: US 9,041,403 B2
(45) Date of Patent: May 26, 2015

(54) ELECTRICAL STORAGE MODULE

(75) Inventor: Sadayuki Aoki, Takahagi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 904 days.

(21) Appl. No.: 13/076,916

(22) Filed: Mar. 31, 2011

(65) Prior Publication Data

US 2011/0248719 A1 Oct. 13, 2011

(30) Foreign Application Priority Data

Apr. 9, 2010 (JP) ................................ 2010-090017

(51) Int. Cl.
*G01N 27/416* (2006.01)
*H01R 4/28* (2006.01)
*H01M 10/48* (2006.01)

(52) U.S. Cl.
CPC .................................. *H01M 10/482* (2013.01)

(58) Field of Classification Search
USPC .......................................... 320/112; 324/426
See application file for complete search history.

(56) References Cited

U.S. PATENT DOCUMENTS

| | | | | |
|---|---|---|---|---|
| 6,051,955 A * | 4/2000 | Saeki et al. | ..................... | 320/121 |
| 6,094,031 A * | 7/2000 | Shimane et al. | ............... | 320/118 |
| 6,563,291 B2 * | 5/2003 | Tamura et al. | ................. | 320/116 |
| 7,053,588 B2 * | 5/2006 | Nakanishi et al. | ............ | 320/104 |
| 7,405,579 B2 * | 7/2008 | Okamoto et al. | ............. | 324/713 |
| 7,456,605 B2 * | 11/2008 | Nakasho et al. | ............... | 320/107 |
| 8,076,020 B2 * | 12/2011 | Goto et al. | ..................... | 429/129 |
| 2002/0030468 A1 * | 3/2002 | Inui et al. | ....................... | 320/112 |
| 2005/0142417 A1 * | 6/2005 | Sato et al. | ........................ | 429/34 |
| 2007/0120526 A1 * | 5/2007 | Kumeuchi et al. | ............ | 320/112 |
| 2007/0132429 A1 | 6/2007 | Onuki et al. | | |
| 2007/0172735 A1 | 7/2007 | Hall et al. | | |
| 2010/0247998 A1 * | 9/2010 | Hostler et al. | ................. | 429/120 |
| 2011/0269001 A1 | 11/2011 | Onuki et al. | | |

FOREIGN PATENT DOCUMENTS

| | | |
|---|---|---|
| JP | 4-162691 A | 6/1992 |
| JP | 2000-208118 A | 7/2000 |
| JP | 2004-47167 A | 2/2004 |
| JP | 2004-273351 A | 9/2004 |
| JP | 2007-165134 A | 6/2007 |
| JP | 2008-300083 A | 12/2008 |
| JP | 2009-26598 A | 2/2009 |

OTHER PUBLICATIONS

Japanese language Office Action with English translation dated Aug. 27, 2013 (6 pages).

* cited by examiner

*Primary Examiner* — Drew A Dunn
*Assistant Examiner* — Steven T Chung
(74) *Attorney, Agent, or Firm* — Crowell & Moring LLP

(57) ABSTRACT

An electrical storage module includes: a plurality of electrical storage units; electrical storage unit connecting conductors electrically connecting the plurality of electrical storage units; and a voltage detection line unit electrically connected to the plurality of electrical storage units for detecting a voltage of each of the plurality of the electrical storage units, wherein: the voltage detection line unit is unitized with the electrical storage unit connecting conductors, includes voltage detection lines for each detecting the voltage of one of the plurality of the electrical storage units, and is configured such that, when the electrical storage unit connecting conductors are mechanically connected to the plurality of electrical storage units, the voltage detection lines are electrically connected to the electrical storage units.

13 Claims, 11 Drawing Sheets

ELECTRICAL STORAGE MODULE

INCORPORATION BY REFERENCE

The disclosure of the following priority application is herein incorporated by reference: Japanese Patent Application No. 2010-090017 filed Apr. 9, 2010.

BACKGROUND OF THE INVENTION

1. Field of the Invention

The present invention relates to an electrical storage module capable of storing and discharging electrical energy.

2. Description of Related Art

For example, techniques disclosed in Japanese Laid-Open Patent Publication Nos. 2004-273351 and 2004-47167 are known as background arts related to an electrical storage module. Japanese Laid-Open Patent Publication Nos. 2004-273351 and 2004-47167 disclose techniques capturing terminal voltage from a laminate battery using a voltage detection line provided on a flexible printed circuit board.

SUMMARY OF THE INVENTION

In recent years, according to spread of electrification, enhancement of addressing emergencies such as a disaster, promotion of utilizing clean energy and the like, introduction of systems utilizing electrical energy has increased. In recent several years, demands for a further check on global warming, further enhancement of energy conservation and the like have increased from a social point of view. Accordingly, it is required to enhance introduction of systems utilizing electrical energy. In order to facilitate introduction of the systems utilizing electrical energy, measures are required for reducing initial investment in introduction of the systems to facilitate introduction of the systems. Thus, further cost reduction is required for each component devices configuring the systems utilizing electrical energy.

Most of systems utilizing electrical energy are equipped with electrical storage devices capable of storing and discharging electrical energy as power supplies. The electrical storage devices are more expensive than other component devices, such as for example power converting devices and motors. Electrical storage devices including a lot of high-performance electrical storage units with high capacity and high power are particularly expensive. Accordingly, cost reduction is highly demanded. Thus, also in the voltage detection wiring structure of the electrical storage module in the background art, further cost reduction is demanded.

According to the 1st aspect of the present invention, an electrical storage module, comprises: a plurality of electrical storage units; electrical storage unit connecting conductors electrically connecting the plurality of electrical storage units; and a voltage detection line unit electrically connected to the plurality of electrical storage units for detecting a voltage of each of the plurality of the electrical storage units, wherein: the voltage detection line unit is unitized with the electrical storage unit connecting conductors, includes voltage detection lines for each detecting the voltage of one of the plurality of the electrical storage units, and is configured such that, when the electrical storage unit connecting conductors are mechanically connected to the plurality of electrical storage units, the voltage detection lines are electrically connected to the electrical storage units.

According to the 2nd aspect of the present invention, in the electrical storage module according to the 1st aspect, it is preferred that: the voltage detection line unit includes a circuit board provided with the voltage detection lines, connection terminals electrically connected to the electrical storage unit connecting conductors, a holding member holding the connection terminals, and an elastic member fixing the circuit board by pressing the circuit board against the holding member; and one of the voltage detection lines is contacted with one of the connection terminal, and is pressed against the one of the connection terminals by a portion of the circuit board corresponding to a contacting portion being pressed by the elastic member.

According to the 3rd aspect of the present invention, in the electrical storage module according to the 2nd aspect, it is preferred that the circuit board is a flexible printed circuit board configured by arranging the voltage detection lines having a foil-like form on a flexible material.

According to the 4th aspect of the present invention, in the electrical storage module according to the 3rd aspect, it is preferred that the flexible material is polyimide.

According to the 5th aspect of the present invention, in the electrical storage module according to the 2nd aspect, it is preferred that: the circuit board is provided with an output portion for outputting voltage from the voltage detection line unit; the output portion is provided with a connector including connector terminals; and the connector terminals are electrically connected with the voltage detection lines at a side thereof opposite to a side pressed against the connection terminals.

According to the 6th aspect of the present invention, in the electrical storage module according to the 5th aspect, it is preferred that the voltage detection line at the side opposite to the side pressed against the connection terminal and the connector terminal are electrically connected to each other by contacting the voltage detection line at the side opposite to the side pressed against the connection terminal with the connector terminals, pressing the circuit board corresponding to a contacting portion by the elastic member, and pressing the voltage detection line at the side opposite to the side pressed against the connection terminal against the connector terminals.

According to the 7th aspect of the present invention, in the electrical storage module according to the 1st aspect, it is preferred that a fuse mechanism that melts and opens one of the voltage detection lines due to electrical current flowing through the one of the voltage detection lines is provided at a portion of the one of the voltage detection lines adjacent to one of the connection terminals.

According to the 8th aspect of the present invention, in the electrical storage module according to the 7th aspect, it is preferred that the fuse mechanism is configured by forming the portion of the one of the voltage detection lines more narrowly in width than remaining portions.

DESCRIPTION OF PREFERRED EMBODIMENTS

Figure 1:
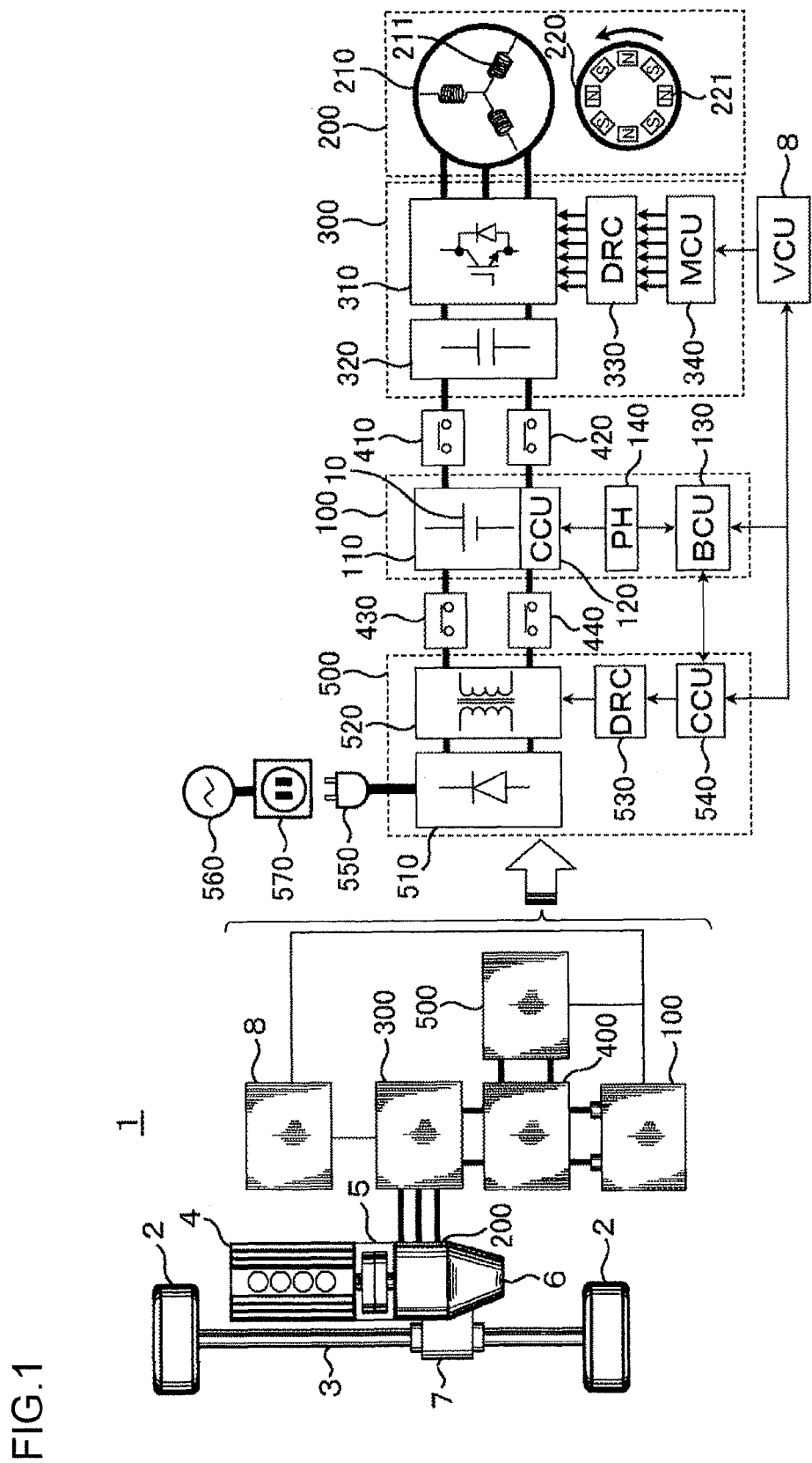
FIG. 1 is a block diagram showing a configuration of a drive system of a plug-in hybrid vehicle (embodiment 1).

Embodiments of the invention of the present application will hereinafter be described with reference to drawings.

Examples of the embodiments below will be described using cases of applying the invention of the present application to an electrical storage device configuring a power supply of a vehicle, and particularly cases of applying the invention to a battery device configuring a vehicle driving power supply of an electrical automobile, which is one of electrical vehicles.

As to an electrical automobile, description is made using an example of a plug-in hybrid electrical vehicle (PHEV), which includes an engine or an internal-combustion engine, and an electrical machine as drive source (prime mover) of the vehicle and equipped with a charger for charging a battery device with ac power supplied from an external power supply, such as a commercial power supply and an electrical service station. The electrical automobile may be another electrical vehicle. The vehicle may be a hybrid electrical vehicle (HEV), which includes an engine and an electrical machine as drive sources for the vehicle but without a charger for charging a battery device with ac power supplied from an external power supply, such as a commercial power supply and an electrical service station (the battery device is charged with electrical power acquired by regeneration during deceleration of the vehicle and/or electrical power acquired from a generator driven by the prime mover). The vehicle may also be a pure electrical vehicle (EV), which does not have an engine as a drive source of the vehicle (adopts an electrical machine generating electrical power as a sole drive source of the vehicle) but is equipped with a charger for charging a battery device with ac power supplied from an external power supply, such as a commercial power supply and an electrical service station.

As to the battery device configuring a vehicle driving power supply, description is made using an example of a lithium ion battery device including a flattened prismatic lithium ion secondary battery cell (hereinafter, simply described as "battery cell") as an electrical storage unit. The battery device may be a device including another electrical storage unit, which may be secondary battery, such as a nickel metal hydride battery and a lead battery, or a capacitive device, such as a capacitor.

The configurations of the embodiments to be described later are applicable to a battery device configuring another vehicle driving power supply of another electrical vehicle, which may be a railway vehicle such as a hybrid electrical train, a bus, a truck and an industrial vehicle, such as a battery forklift truck.

Further, the configurations of the embodiments to be described later are applicable to an electrical storage device configuring a power supply for anything other than the electrical vehicle, such as an uninterruptible power supply adopted for a computer system and a server system, a power supply adopted for in-house power generation facilities, and a power supply adopted for power plants utilizing natural energy including sunlight, wind power, and geothermal power.

In the plug-in hybrid vehicle, electrical energy charged in the battery device is discharged as dc power when the vehicle is driven by means of electrical power (rotational power). The discharged dc power is converted into prescribed ac power with controlled voltage and phase by an inverter device (power converting device). This functions as an electrical machine during power running of the vehicle. The converted power is supplied to a motor/generator (rotating electrical machine) to generate electric driving power for the plug-in hybrid vehicle. Electrical energy is charged into the battery device by means of ac power acquired by regeneration during deceleration of the vehicle and/or ac power acquired by the generator driven by the prime mover. The regeneration power is ac power acquired by the motor/generator driven as a generator by means of drive power supplied from the vehicle side. The regeneration power is converted by the inverter device into prescribed dc power with controlled voltage, which is subsequently supplied to the battery device and charged therein.

The electrical energy charged in the battery device can be used as dc power in a case of starting the engine as an internal combustion engine and in a case of driving electrical components, such as car audio including a radio, a car navigation device and lights. In these cases, the dc power discharged from the battery device is converted by the power converting device into prescribed ac power with controlled voltage and phase or prescribed dc power with controlled voltage (stepping up and down). Subsequently, the converted power is supplied to each electrical load and other electrical storage devices. The battery device is charged with electrical energy of single phase ac power introduced from a commercial power supply, which is a home-use power supply, or single-phase or three-phase ac power purchased through an electrical service station provided at an electrical station or a commercial facility. In these cases, the single-phase or three-phase ac power supplied from an external power supply, such as the commercial power supply or the electrical service station, is converted into prescribed dc power with controlled voltage by a charger mounted on the plug-in hybrid vehicle. Subsequently, the converted power is supplied to the battery device and charged therein.

The battery device includes a battery module configured by stacking a plurality of battery cells. The battery module is required to output several hundred volts. Accordingly, in the battery module, battery cells each outputting several volts (e.g., average nominal output voltage is 3.6 volts) are electrically connected in series and the required number of battery cells is determined so as to satisfy the required output voltage.

In the battery module, it is required to detect and control the statuses of the battery cells in order not to overcharge and overdischarge the battery cells. One of parameters for detecting the status of the battery cell is a terminal voltage of the battery cell. Accordingly, the battery module detects the terminal voltage of each battery cell. Detection of the voltage requires to electrically connecting the controller and the battery cell by means of a voltage detection wiring (voltage sensing wiring) and capture the terminal voltage of each battery cell into the controller via the voltage detection line (voltage sensing line). There are various ways of attaching the voltage detection line to the connector connected to the battery cell and the controller. Some of the ways complicate procedures for assembling the battery module, thereby increasing manufacturing cost of the battery module. A battery device with a large capacity has an increased number of battery cells. This increases the number of spots at which the voltage detection line is attached, and complicates the procedures for assembling the battery module accordingly, thereby increasing the manufacturing cost of the battery module.

Thus, in embodiments to be described below, a voltage detection line for capturing voltage of the battery cell and a battery cell connecting conductor for electrically connecting the battery cells are integrated or unitized into a subunit. When the battery cell connecting conductor thus integrated into the subunit is mechanically connected to the battery cells, the voltage detection line is also connected electrically to the battery cell.

More specifically, the voltage detection line unit is a subunit preliminarily configured in a procedure separated from the procedures for assembling the battery module. The voltage detection line unit includes: a connection terminal (a voltage detection terminal) electrically connected to the battery cell connecting conductor; a circuit board provided with a voltage detection line; a holding member for holding the connection terminal; and an elastic member fixing the circuit board to the holding member. The voltage detection line unit adopts a configuration that contacts the voltage detection line with the connection terminal, a portion of the circuit board corresponding to the contacting portion is pressed by the elastic member and presses the voltage detection line and the connection terminal against each other.

According to such a voltage detection line unit, in the procedures for assembling the battery module, the battery cell connecting conductor is mechanically connected to the battery cell and the voltage detection line is also connected electrically to the battery cell. Thus, in the procedures for assembling the battery module, an operation of connecting the voltage detection line to the battery cell is omitted, thereby enabling workability in assembling the battery module to be improved, and allowing productivity of the battery module to be increased. Accordingly, the embodiments to be described later enable the procedures for assembling the battery module to be simplified, and allow cost of manufacturing the battery module to be reduced. Therefore, the embodiment to be described later enable the cost of the battery module to be reduced.

The battery cell connecting conductor and the connection terminal are electrically connected to each other via a female-female relay terminal (connection terminal). The female-female relay terminal is held by a holding member. A battery cell connecting conductor is inserted into a female slot of the terminal at one side end. A connection terminal is inserted into a female slot of the terminal at the other side end. Connection between conductors using such a female-female relay terminal negates the need to use joining, such as welding, which complicates workability, thereby manufacturability of the voltage detection line unit to be improved.

A connecting portion of the battery cell connecting conductor to the connection terminal is arranged at substantially center of the battery cells that are electrically connected by the battery cell connecting conductor, that is, at the center in the longitudinal direction of the battery cell connecting conductor. The connecting portion of the battery cell connecting conductor to the connection terminal is thus arranged at the substantially center between the battery cells that are electrically connected by the battery cell connecting conductor. Accordingly, the electrical connection is established by the battery cell connecting conductor, and voltage of the battery cell can be detected using the potential of the central point of the battery cells. This reduces electrical influence owing to difference between the distance from the connecting portion of the battery cell connecting conductor with the connection terminal to one battery cell and the distance from the connecting portion of the battery cell connecting conductor with the connection terminal to the other battery cell, thereby enabling accuracy in detecting voltage of the battery cell to be improved.

The circuit board is a flexible printed circuit board configured by arranging a foil-like voltage detection line at a flexible material such as polyimide. Such use of the flexible printed circuit board improves handling in comparison with lead wiring, facilitates downsizing and reduction in weight further than a rigid circuit board, and in turn improving manufacturability of the voltage detection line unit and facilitating downsizing and reduction in weight.

Since the flexible printed circuit board is used, a fuse mechanism for melting and opening the voltage detection line due to electrical current flowing in the voltage detection line can integrally be arranged at a portion of the voltage detection line in the proximity of contact with the connection terminal. The fuse mechanism can be configured by forming a part of the voltage detection line more narrowly in width than the remaining portions. Such arrangement of the fuse mechanism on the voltage detection line enables the voltage detection line to be immediately broken before, for example, an abnormally high current is drawn from the battery cell and exhibits thermal runaway. This allows the controller to be protected from the abnormal current of the battery cell, thereby enabling reliability and safety of the battery device to be improved. Further, integration of the fuse mechanism into the voltage detection line allows an operation of connecting a separately provided fuse mechanism to be omitted in the procedures for assembling the battery module. Accordingly, advantageous effects of reduction in manufacturing cost of the battery module by simplification of the procedures for assembling the battery module can be improved.

An output portion for outputting voltage from the voltage detection line unit is provided at the circuit board; the output portion is provided with a connector including a connector terminal; and the connector terminal is electrically connected with the voltage detection line at a side thereof opposite to a side pressed against the connection terminal. The side of the voltage detection line opposite to the side pressed against the connection terminal and the connector terminal are electrically connected to each other by contacting the side of the voltage detection line opposite to the side pressed against the connection terminal with the connector terminal, pressing the circuit board corresponding to the contacting portion against the elastic member, and pressing the side of the voltage detection line opposite to the side pressed against the connection terminal against the connector terminal. Adoption of such connection negates the need for using joining, such as welding, complicating workability for connection between the voltage detection line and the connector, thereby allowing manufacturability of the voltage detection line unit to be improved.

Connection between the voltage detection line and the connection terminal and connection between the voltage detection line and the connector terminal are made by pressing connection of an elastic member. A U-shaped leaf spring is adopted as the elastic member. Since the pressing connection by the elastic member is thus adopted, the circuit board can easily be replaced. For example, in a case of the fuse mechanism is activated and melts and opens the voltage detection line, the elastic member is removed and the circuit board is removed from the voltage detection line unit and subsequently a new circuit board is mounted on the voltage detection line unit and then fixed by the elastic member. This allows the entire components of the voltage detection line unit to be reusable except for the voltage detection line. Accordingly, embodiments to be described later are excellent in recyclability and environmentality, and facilitate reduction in cost of the battery module.

In the above, a voltage detection line, a battery cell, a battery cell connecting conductor, a connection terminal, an elastic member, a female-female relay terminal, a fuse mechanism, a connector terminal, an elastic member or the like in a battery module is explained as a single component for simplifying the explanation. However, each of the components is referred to as plural components in a battery module, as explained in the below and as shown in figures. Hereinafter, the description will be made in detailed using drawings.

First Embodiment

A first embodiment will be described with reference to FIGS. 1 to 6.

First, referring to FIG. 1, a configuration of a drive system of a plug-in hybrid vehicle 1, which includes a battery device 100, will be described.

FIG. 1 shows a configuration of the drive system of the plug-in hybrid vehicle 1 and a configuration of electrical connection between components of electrical driving device configuring a part of the drive system.

Note that, in FIG. 1, thick lines indicate a power electrical system (high voltage) and narrow lines indicate an electronic system (low voltage).

The plug-in hybrid vehicle (hereinafter, described as "PHEV") 1 includes the drive system, which is a parallel hybrid system.

The drive system of the parallel hybrid system includes an engine 4, which is an internal combustion engine, and a motor/generator 200. The engine 4 and the motor/generator 200 are arranged in parallel in terms of energy flow with respect to a driven wheels 2 (in terms of structure, the engine 4 and the motor/generator 200 are mechanically coupled in series via a clutch 5 as a power transmission and control mechanism). This configuration allows the driven wheels 2 to be driven by the rotational power of the engine 4, by the rotational power of the motor/generator 200, and by both rotational powers of the engine 4 and the motor/generator 200. That is, the drive system of the parallel hybrid system includes: an engine drive device that adopts the engine 4 as a power source and is mainly used as a drive source of the PHEV 1; and an electrical driving device that adopts the motor/generator 200 as a power source and is mainly used as a drive source for the PHEV 1 and an electrical power source for the PHEV 1.

Hybrid systems include a so-called series hybrid system, which drives a generator using the rotational power of an engine as an internal combustion engine, drives a motor/generator using the power generated by the driving of the generator, and in turn drives a driven wheel using the rotational power generated by the driving of the motor/generator. The energy flow is serial from the engine to the driven wheel. Further, the hybrid systems include a series-parallel hybrid system, where the parallel hybrid system and the series hybrid system are integrated (a system that mechanically couples an engine and two motor/generators using a power transmission mechanism such as a planetary gear mechanism so as to distribute a part of rotational power of the engine to the motor/generator for generation and causes the motor/generator to generate power and to drive the motor/generator for driving by means of the thus generated electrical power). In this embodiment, the description is made using an example of the drive system of the parallel hybrid system. However, an after-mentioned battery device 100 of the present embodiment may be applied to a battery device of another hybrid system described above.

An axle shaft 3 is rotatably supported at a front or rear portion of a vehicle body, which is not shown.

The opposite ends of the axle shaft 3 are provided with a pair of driven wheels 2. Although not shown, axle shaft provided with a pair of follower wheels at its opposite ends is rotatably supported at a rear or front portion of the body.

The PHEV 1 adopts a front-wheel drive system, where the driven wheels 2 are disposed at the front and the follower wheels (non-driven wheels) are disposed at the rear. A rear-wheel drive system or a four-wheel drive system (a system where one pair of front wheels and rear wheels are driven by the engine and the other pair is driven by the electrical driving device) may be adopted as the drive system.

A differential gear (hereinafter, described as "DIF") 7 is provided at the center of the axle shaft 3. The axle shaft 3 is mechanically coupled to the output side of the DIF 7. The input side of the DIF 7 is mechanically coupled with an output shaft of a transmission 6. The DIF 7 is a differential power distribution mechanism that distributes rotational drive power, having been changed in speed and transmitted by the transmission 6, to right and left parts of the axle shaft 3. The input side of the transmission 6 is mechanically coupled with the output side of the motor/generator 200. The input side of the motor/generator 200 is coupled with the output side of the engine 4 via the clutch 5 as a power transmission and control mechanism. The clutch 5 is controlled to be in an engaged state when transmitting the rotational power of the engine 4 to the driven wheels 2, and in a disengaged state when not transmitting the rotational power of the engine 4 to the driven wheels 2.

The motor/generator 200 and the clutch 5 are stored in a casing of the transmission 6.

The motor/generator 200 is a rotating electrical machine that includes an armature (a stator in this embodiment) 210 provided with an armature winding 211, and a field magnet (a rotor in this embodiment) 220 arranged oppositely to the armature 210 via a gap and including a permanent magnet 221. The motor/generator 200 functions as a motor during power running, and as a generator during generation (regeneration).

This embodiment is described using an example adopting a three-phase alternating current synchronous machine (permanent magnet field magnet type) as the motor/generator 200. However, another three-phase alternating current synchronous machine (wound field magnet type) or three-phase alternating current induction machine (using a field magnet equipped with a conductive bar short-circuited to a field magnet iron core) may be adopted.

In cases where the motor/generator 200 functions as a motor, that is, cases of a drive mode requiring rotational power, such as cases of power running of the PHEV 1 and starting the engine 4, the electrical energy stored in the battery device 100 is supplied to the armature winding 211 via an inverter device 300. Accordingly, the motor/generator 200 generates rotational power (mechanical energy) by magnetic action between the armature 210 and the field magnet 220, and outputs the rotational power. The rotational power output from the motor/generator 200 is transmitted to the axle shaft 3 via the transmission 6 and the DIF 7 and drives the driven wheels 2 during power running of the PHEV 1, and is transmitted to the engine 4 via the clutch 5 and drives the engine 4 when starting the engine 4.

In cases where the motor/generator 200 functions as a generator, that is, cases of a drive mode requiring regeneration, such as cases of regeneration during deceleration and braking of the PHEV 1 and requiring charging of the battery device 100 during driving of the PHEV 1, the mechanical energy (rotational power), having been transmitted from the driven wheels 2 or the engine 4, is transmitted to the motor/generator 200 and drives the motor/generator 200. The motor/generator 200 is thus driven, which induces voltage at the armature winding 211 by magnetic action between the armature 210 and the field magnet 220. Accordingly, the motor/generator 200 generates electrical power, and outputs the power. The power output from the motor/generator 200 is supplied to the battery device 100 via the inverter device 300. The battery device 100 is charged therewith.

The driving of the motor/generator 200 is controlled by controlling electrical power between the armature 210 and the battery device 100 by the inverter device 300. That is, the inverter device 300 is a controller of the motor/generator 200. The inverter device 300 is a power converting device that converts electrical power from dc into ac and ac into dc by switching operation of a switching semiconductor element. The inverter device 300 includes: a power module 310; a drive circuit 330 driving the switching semiconductor element mounted on the power module 310; and an electrolytic capacitor 320 that is electrically connected to the dc side of the power module 310 in parallel and smoothes the dc voltage; and a motor controller 340 that generates a switching instruction for the switching semiconductor element of the power module 310 and outputs a signal corresponding to this switching instruction to the drive circuit 330.

The power module 310 is a structure where six switching semiconductor elements are mounted on a substrate and electrically connected by connecting conductor such as aluminum wiring such that two (upper and lower arms) switching semiconductor elements are electrically connected in series, and three phases of series circuits (each arm for one phase) are electrically connected in parallel (three-phase bridge connection), thereby configuring a power converter circuit.

A metal-oxide-semiconductor field-effect transistor (MOSFET) or an insulated gate bipolar transistor (IGBT) are adopted as the switching semiconductor element. Here, in a case where the power converter circuit is configured with the MOSFET, there is a parasitic diode between drain and source electrodes, which negates the need for implementing a diode element therebetween. On the other hand, in a case where the power converter circuit is configured with the IGBT, there is no diode element between collector and emitter electrodes. Accordingly, it is further required to electrically connect a diode element therebetween in inverse-parallel.

A side of each upper arm opposite to a side connected to the lower arm (a collector electrode side in the case of the IGBT) is derived to the outside from a dc side of the power module 310, and electrically connected to the positive electrode side of the battery device 100. A side of each lower arm opposite to a side connected to the upper arm (an emitter electrode side in the case of the IGBT) is derived to the outside from the dc side of the power module 310, and electrically connected to the negative electrode side of the battery device 100. A neutral point of each arm, which is a connection point between the side of the upper arm connected to the lower arm (the emitter electrode side of the upper arm in the case of the IGBT) and the side of the lower arm connected to the upper arm (the collector electrode side of the lower arm in the case of the IGBT), is derived to the outside from the ac side of the power module 310 and electrically connected to a winding of the corresponding phase of the armature winding 211.

The electrolytic capacitor 320 is a smoothing capacitor that suppresses variation in voltage caused due to high-speed switching operation of the switching semiconductor element. A film capacitor may be adopted as the smoothing capacitor instead of the electrolytic capacitor 320.

The motor controller 340 is an electronic circuit device that, responsive to a torque instruction signal output from a vehicle controller 8 conducting overall control of the vehicle, generates a switching instruction signal (e.g. a PWM (pulse-width modulation) signal) for the six switching semiconductor elements and outputs the signal to the drive circuit 330. The motor controller 340 is configured with a plurality of electronic components including a computing processor such as a microcomputer mounted on a circuit board, and arranged in an inverter casing thermally insulated from the power module 310.

The drive circuit 330 is an electronic circuit device that, responsive to the switching instruction signal output from the motor controller 340, generates a drive signal for each of the six switching semiconductor elements and outputs the signal to the gate electrodes of the six switching semiconductor elements. The drive circuit 330 is configured with a plurality of electronic components such as a switching semiconductor element and an amplifier mounted on a circuit board, and arranged close to the power module 310, for example, at a top part of a case of the power module 310.

The vehicle controller 8 generates a motor torque instruction signal for the motor controller 340 and an engine torque instruction signal for an engine controller (not shown) on the basis of a plurality of status parameters representing driving status of the vehicle, such as a request for torque from a driver and a vehicle speed, and outputs the respective torque instruction signals to the corresponding controllers.

The engine controller is an electronic device that controls driving of air throttle valves, fuel injection valves and intake/exhaust valves, which are components of the engine 4. The engine controller generates drive instruction signals for respective components on the basis of the engine torque instruction signal acquired from the output signal from the vehicle controller 8, and outputs the drive instruction signal to drive circuits of the respective components.

The battery device 100 is an electrical storage device that configures a drive power supply for the motor/generator 200. The battery device 100 has a high voltage at least 200 volts of nominal output voltage, and is higher in output power density and energy density than a conventional drive battery for a hybrid vehicle. The battery device 100 is electrically connected to the inverter device 300 and the charger 500 via a junction box 400. A lithium ion battery device is adopted as the battery device 100.

The battery device 100 is an electrical storage device charged and discharged by the inverter device 300 and the charger 500, and includes a battery module 110 and a controller as main components.

The battery module 110 and the controller are housed in one power supply casing together with a sensor and a cooling device (e.g. a cooling fan that blows air as cooling medium into the battery module 110) and other components including a relay. The power supply casing is arranged under a seat in the passenger room or in the trunk room or under the floor. The power supply casing may store high voltage electrical devices analogous to the battery device 100, such as the inverter device 300 and the charger 500, together therewith. This storage layout facilitates wiring of high voltage cables and at the same time, reduction in wiring length reduces inductance, thereby capable of reducing in electrical loss.

The battery module 110 is a storage of electrical energy, and electrically connected to the inverter device 300 and the charger 500.

The battery module 110 includes a plurality of lithium ion battery cells 10 (hereinafter, simply described as "battery cells 10") capable of storing and releasing the electrical energy (charging and discharging of dc power). The plurality of battery cells 10 are arranged in a storage case (module case) and electrically connected in series. This layout configures one assembled battery in the battery module 110. The battery cell 10 is a minimum configurational unit in the battery module 110, and also referred to as an electrical cell. The description is made using an example that adopts the battery cell 10 with 3.0-4.2 volts of nominal output voltage (3.6 volts of average nominal output voltage). However, another cell with a voltage specification other than this may be adopted.

The plurality of battery cells 10 are divided and separated into a plurality of battery groups by a prescribed number of units for the sake of status management and control. In other words, a prescribed number of battery cells 10 are electrically connected in series and thus configure one battery group. The plurality of battery groups are electrically connected in series and thus configure the assembled battery. The prescribed number of units may be separated in a regular manner according to an order of potential from the highest potential side to the lowest potential side. For example, this separation manner thus arranges four, six, ten, twelve, . . . . The prescribed number of units may be complex according to the order of potential from the highest potential side to the lowest potential side, such as four and six are combined.

In actuality, the PHEV 1 is equipped with one to two hundreds of battery cells 10, which are electrically connected in series or in series/parallel.

A charging/discharging path between the positive electrode side of the battery module 110 and the dc positive electrode side of the inverter device 300 (power module 310) is electrically connected in series with a current measurement means (a current sensor or a current measurement circuit) for detecting electrical current supplied from the battery module 110 to the inverter device 300 (power module 310) or electrical current supplied from the inverter device 300 (power module 310) to the battery module 110. A voltage measurement means (a voltage sensor or a voltage measurement circuit) for detecting voltage between both electrodes of the battery module 110 is electrically connected in parallel between the both electrodes of the battery module 110 (between the positive electrode and negative electrode sides). Plural pieces of temperature measurement means (sensors, such as thermistors or thermocouples, or temperature measurement circuits) are provided in the battery module 110.

The controller is an electronic controller including a plurality of electronic circuit components. The controller manages and controls the status of the battery module 110, and provides the inverter device 300 and the charger 500 with an allowable charging/discharging amount and thus controls input and output of electrical energy into and from the battery module 110.

The controller has a configuration functionally divided into two layers. More specifically, the controller includes: a battery controller 130 to be regarded as a higher layer (parent) in the battery device 100; and a cell controller 120 to be regarded as a lower layer (child) with respect to the battery controller 130.

The electronic circuit components configuring the battery controller 130 and the cell controller 120 are mounted on respective circuit boards independent from each other. The circuit board mounted with the electronic circuit component configuring the cell controller 120 is arranged in the battery module 110 in terms of functionality of the cell controller 120. The circuit board mounted with the electronic circuit components configuring the battery controller 130 are separately housed in a casing for the controller, and arranged close to the battery module 110. In a case of integrating the electronic circuit components configuring the battery controller 130 and the cell controller 120 into one common circuit board, this circuit board is housed in the casing for the controller and the casing is arranged close to the battery module 110.

The battery controller 130 and the cell controller 120 are configured so as to be capable of transmitting and receiving signals to and from each other, but electrically insulated from each other. This is because operating power supplies thereof are different from each other and thus different in reference potential. More specifically, this is because the cell controller 120 adopts the battery module 110 floating from the chassis ground as the power supply but the battery controller 130 adopts as the power supply a low voltage battery (e.g. 14-volt battery) for vehicle-mounted auxiliary equipment that employs the chassis ground as the reference potential as the power supply. Accordingly, an insulator 140, such as a photo coupler, a capacitive coupling element and a transformer, are provided on a signal transmitting path connecting the battery controller 130 and the cell controller 120. This allows the battery controller 130 and the cell controller 120 to transmit signals using those with the respective reference potentials different from each other. The insulator 140 is mounted on the circuit board mounted with the electronic circuit components configuring the cell controller 120.

A signal transmitting circuit includes a signal transmitting circuit for serial communication that is used in at least two ways. This embodiment employs a signal transmitting circuit adopting a communication standard conforming to CAN (Controller Area Network), which is referred to as LIN (Local Interconnect Network). The signal transmitting circuit transmits a communication command signal output from the battery controller 130, which is a multi-byte signal provided with a plurality of regions including data regions indicating contents of communication (control).

The communication command signals output from the battery controller 130 via the signal transmitting circuit includes: an instruction signal for requesting transmission of detected terminal voltage of the battery cell; an instruction signal for adjusting a charging status of the battery cell; an instruction signal for activating the cell controller 120; an instruction signal for stopping operation of the cell controller 120; and an instruction signal for verifying abnormality notified from the cell controller 120.

The cell controller 120 operates as branches of the battery controller 130 on the basis of the instruction signals output from the battery controller 130, and manages and controls respective statuses of a plurality of the battery cells 10. Thus, the cell controller 120 is electrically connected to both terminals (the positive electrode side terminal and the negative electrode side terminal) of a plurality of the battery cells 10 via wiring for detecting voltage, and detects voltage between the terminals of each of a plurality of the battery cells 10.

The cell controller 120 adjusts the charging status of the battery cell 10 having the need to adjust the charging status among the plurality of battery cells 10, on the basis of the instruction signal on adjustment of the charging status output from the battery controller 130. Thus, a bypass circuit is electrically connected in parallel between the terminals of a plurality of the battery cell 10. The bypass circuit includes a series circuit where a resistor and a switching semiconductor element are electrically connected in series. The charging status of the battery cell 10 can be adjusted by controlling on and off of the switching semiconductor element of the bypass circuit of the cell controller 120.

The battery controller 130 is an electronic controller that manages and controls the status of the battery module 110 and notifies the vehicle controller 8 or the motor controller 340 of an allowable charging/discharging amount and thus controls input and output of electrical energy to and from the battery module 110. The battery controller 130 includes a computing processor, such as a microcomputer and a digital signal processor, and mounted on a circuit board together with the other electronic circuit components including storage device.

The battery controller 130 receives a plurality of signals including: measurement signals output from the aforementioned current measurement means, voltage measurement means and temperature measurement means; detection signals on voltages between terminals of a plurality of the battery cells output from the cell controller 120; abnormality signals output from the cell controller 120; on-off signals based on operation of ignition key switch; and signals output from the vehicle controller 8 as a higher-level controller or the motor controller 340. The on-off signal based on operation of ignition key switch and the signals output from the vehicle controller 8 as the higher-level controller or the motor controller 340 are input into the battery controller 130 via a signal transmitting circuit that is referred to as CAN (Controller Area Network) and connects a plurality of controllers in the vehicle, such as the battery controller 130, the vehicle controller 8 and the motor controller 340, for mutually transmitting and receiving information thereof.

The battery controller 130 performs a plurality of computations including a computation for detecting a status of the battery module 110 (e.g., the charging status of the battery module 110, hereinafter referred to as SOC (State Of Charge), and the deterioration status, hereinafter referred to as SOH (State Of Health)), a computation for controlling the battery module 110, and a computation for controlling the charging/discharging amount of the battery module 110, on the basis of plural pieces of information including information acquired from the input signals, preset characteristic information of the battery cell and computing information necessary for computing. On the basis of the computed results, the battery controller 130 generates and outputs a plurality of signals including an instruction signal for the cell controller 120, a signal on the allowable charging/discharging amount for controlling the charging/discharging amount of the battery module 110, and a signal on the SOC of the battery module 110, and a signal on the SOH of the battery module 110.

Among the output signals, the plurality of output signals including the signal on allowable charging/discharging amount (the allowable amount of charging/discharging current or the allowable amount of charging/discharging power), the signal on the SOC, the signal on the SOH and the signal on abnormality status notification are output to the vehicle controller 8 as the higher-level controller or the motor controller 340 via a local area network in the vehicle.

The motor controller 340 controls switching of the power module 310, responsive to the signal on the allowable charging/discharging amount output from the battery controller 130 and the torque instruction signal output from the vehicle controller 8, or responsive to the torque instruction signal output from the vehicle controller 8 in consideration of the allowable charging/discharging amount output from the battery controller 130. Accordingly, the inverter device 300 charges and discharges the battery module 110, within the allowable charging/discharging amount, so as to allow the motor/generator 200 to be supplied with the ac power based on the torque instruction signal, or to allow the ac power acquired from the motor/generator 200 to be converted into the dc power and supplied based on the torque instruction signal. That is, control of the inverter device 300 by the battery controller 130 in turn controls charging and discharging of the battery module 110.

The battery controller 130 includes a leak detection device. The leak detection device detects whether or not a leak occurs between the power electrical (high voltage) system from the battery module 110 to the motor/generator 200 and the chassis ground as the reference potential of the electronic (low voltage) system, by electrical connection therebetween.

The battery device 100 is electrically connected with a battery (not shown) with voltage lower than that of the battery device 100. The low voltage battery is a lead battery with a nominal output voltage of 12 volts that is a power supply for operation of vehicle-mounted auxiliary equipment, such as lights and audio equipment, and an electronic controller. The low voltage battery is electrically connected to the battery device 100 via a DC-DC converter, which is not shown. The DC-DC converter is a power converting device for converting dc power by stepping up or down the voltage to a prescribed voltage.

In a case of a plug-in mode where the battery device 100 is charged by the home-use commercial power supply 560 or the power supply device at the electrical service station, a power supply plug 550 at a distal end of a power supply cable electrically connected to an external power supply connection terminal of the charger 500 is inserted into an outlet 570 on the side of the commercial power supply 560, or a power supply cable extending from the power supply device at the electrical service station is connected to the external power supply connection terminal of the charger 500, and thus the charger 500 and the commercial power supply 560 or the power supply device of the electrical service station are electrically connected to each other. This allows a single-phase or three-phase ac power to be supplied from the commercial power supply 560 or the power supply device of the electrical service station to the charger 500. The charger 500 converts the supplied ac power into dc power, adjusts the voltage to the charging voltage of the battery device 100 and subsequently supplies the power to the battery device 100. This allows the battery device 100 to be charged.

This embodiment is described using an example of a case of electrically connecting the home-use commercial power supply 560 and the charger 500 and charging the battery device 100. Note that charging from the power supply device of the electrical service station is performed in a manner basically analogous to that from the home-use commercial power supply 560. However, the charging from the home-use commercial power supply 560 and the charging from the power supply device of the electrical service station are different from each other in current capacity and charging time. The charging of the power supply device of the electrical service station has a current capacity greater than the charging of the home-use commercial power supply 560. This reduces the charging time, thereby allowing quick charging.

The charger 500 is a power converting device that converts the ac power supplied from the home-use commercial power supply 560 into the dc power, increases the voltage of the converted dc power to the charging voltage of the battery device 100, and supplies the power to the battery device 100. The charger 500 includes an ac-to-dc converter circuit 510, a step up circuit 520, a drive circuit 530 and a charging controller 540 as main components.

The ac-to-dc converter circuit 510 is a power converter circuit that converts the ac power supplied from the external power supply into the dc power and outputs the converted power. For example, the circuit 510 includes a bridge connection including a plurality of diode elements. The circuit 510 includes: a rectifier circuit provided for rectifying the ac power supplied from the external power supply to the dc power; and a power factor improving circuit that is electrically connected to the dc side of the rectifier circuit and provided in order to improve the power factor of the output from the rectifier circuit. The circuit converting the ac power into the dc power may be a circuit configured by a bridge connection of a plurality of switching semiconductor elements where diode elements are connected in antiparallel.

The step up circuit 520 is a power converter circuit that increases the voltage of the dc power output from the ac-to-dc converter circuit 510 (power factor improving circuit) to the charging voltage of the battery device 100 and may be, for example, an insulating type DC-DC converter. The insulator type DC-DC converter includes: a transformer; a converter circuit that is electrically connected to the primary winding of the transformer, includes a bridge connection of a plurality of switching semiconductor elements, and converts dc power output from the ac-to-dc converter circuit 510 into ac power and outputs the converted power to the primary winding of the transformer; a rectifier circuit that is electrically connected to the secondary winding of the transformer, includes a bridge connection of a plurality of diode elements, and rectifies ac power generated at the secondary winding of the transformer to dc power; a smoothing reactor electrically connected in series to the positive electrode side of the output side (dc side) of the rectifier circuit; and a smoothing capacitor electrically connected in parallel between the positive electrode and negative electrode of the output side (dc side) of the rectifier circuit.

The charging controller 540 is an electronic circuit device that generates a switching instruction signal (e.g. PWM (pulse-width modulation) signal) for a plurality of switching semiconductor elements of the step up circuit 520 and outputs the signal to the drive circuit 530, responsive to signals output from the vehicle controller 8 and signals output from the controller battery device 100 for controlling a start and completion of charging of the battery device 100 by the charger 500, and power, voltage and current supplied to the battery device 100 from the charger 500 during charging. The charging controller 540 has a configuration with a plurality of electronic components including a computing processor such as a microcomputer that are mounted on a circuit board.

The vehicle controller 8, for example, monitors the voltage of the input side of the charger 500, and output an instruction single for starting charging to charging controller 540 when determining that the charger 500 and the external power supply are electrically connected to each other and voltage is applied to the input side of the charger 500 and thus a charging start status has been established, and outputs an instruction signal for finishing charging to the charging controller 540 when determining that the battery device 100 has reached a fully charged status on the basis of a battery status signal output from the controller of the battery device 100. Such operation may be performed by the controller of the motor controller 340 or the controller of the battery device 100, or by the charging controller 540 itself in collaboration with the controller of the battery device 100

The controller of the battery device 100 detects the status of the battery device 100 and computes an allowable charging amount of the battery device 100 so as to control charging by the charger 500 to the battery device 100, and outputs a signal on the computed result to the charger 500.

The drive circuit 530 is an electronic circuit device that generates drive signals for the plurality of the switching semiconductor element of the step up circuit 520 and outputs the signals to the gate electrodes of the plurality of the switching semiconductor elements, responsive to the torque instruction signal output from the charging controller 540. The drive circuit 530 has a configuration with a plurality of electronic components, such as switching semiconductor elements and an amplifier, mounted on a circuit board.

In a case where the ac-to-dc converter circuit 510 includes the switching semiconductor element, the switching instruction signal for the switching semiconductor element of the ac-to-dc converter circuit 510 is output from the charging controller 540 to the drive circuit 530, and the drive signal for the switching semiconductor element of the ac-to-dc converter circuit 510 is output from the drive circuit 530 to the gate electrode of the switching semiconductor element of the ac-to-dc converter circuit 510, thereby controlling switching of the switching semiconductor element of the ac-to-dc converter circuit 510.

First and second positive electrode side relays 410 and 430 and first and second negative electrode side relays 420 and 440 are housed in the junction box 410.

The first positive electrode side relay 410 is a switch for controlling electrical connection between the dc positive electrode side of the inverter device 300 (power module 310) and the positive electrode side of the battery device 100. The first negative electrode side relay 420 is a switch for controlling electrical connection between the dc negative electrode side of the inverter device 300 (power module 310) and the negative electrode side of the battery device 100. The second positive electrode side relay 430 is a switch for controlling electrical connection between the dc positive electrode side of the charger 500 (step up circuit 520) and the positive electrode side of the battery device 100. The second negative electrode side relay 440 is a switch for controlling electrical connection between the dc negative electrode side of the charger 500 (step up circuit 500) and the negative electrode side of the battery device 100.

The first positive electrode side relay 410 and the first negative electrode side relay 420 are turned on in a case of the drive mode requiring rotational power of the motor/generator 200 and in the case of the drive mode requiring generation of the motor/generator 200, and turned off in a case where the vehicle in a stop mode (a case where an ignition key switch is turned off), in a case where abnormality has occurred in the electrical driving device or the vehicle and in a case where the charger 500 charges the battery device 100. On the other hand, the second positive electrode side relay 430 and the second negative electrode side relay 440 are turned on in a case where the charger 500 charges the battery device 100, and turned off in a case of completion of charging of the battery device 100 by the charger 500 and in a case where abnormality has occurred in the charger 500 or the battery device 100.

Turning on and off of the first positive electrode side relay 410 and the first negative electrode side relay 420 are controlled by an on and off instruction signal output from the vehicle controller 8. The turning on and off of the first positive electrode side relay 410 and the first negative electrode side relay 420 may be controlled by an on and off instruction signal output from another controller, for example, the motor controller 340 or the controller of the battery device 100. Turning on and off of the second positive electrode side relay 430 and the second negative electrode side relay 440 is controlled by an on and off instruction signal output from the charging controller 540. The turning on and off of the second positive electrode side relay 430 and the second negative electrode side relay 440 may be controlled by an on and off instruction signal output from another controller, for example, the controller of the vehicle controller 8 or the battery device 100.

As described above, in this embodiment, the first positive electrode side relay 410, the first negative electrode side relay 420, the second positive electrode side relay 430 and the second negative electrode side relay 440 are arranged between the battery device 100 and the inverter device 300 and the charger 500, and control electrical connection therebetween. This ensures high safety against the high voltage electrical driving devices.

Next, referring to FIGS. 2 to 10, the configuration of the battery cell 10 and the configuration of the battery module 110 including the plurality of battery cells 10 will be described.

Figure 2:
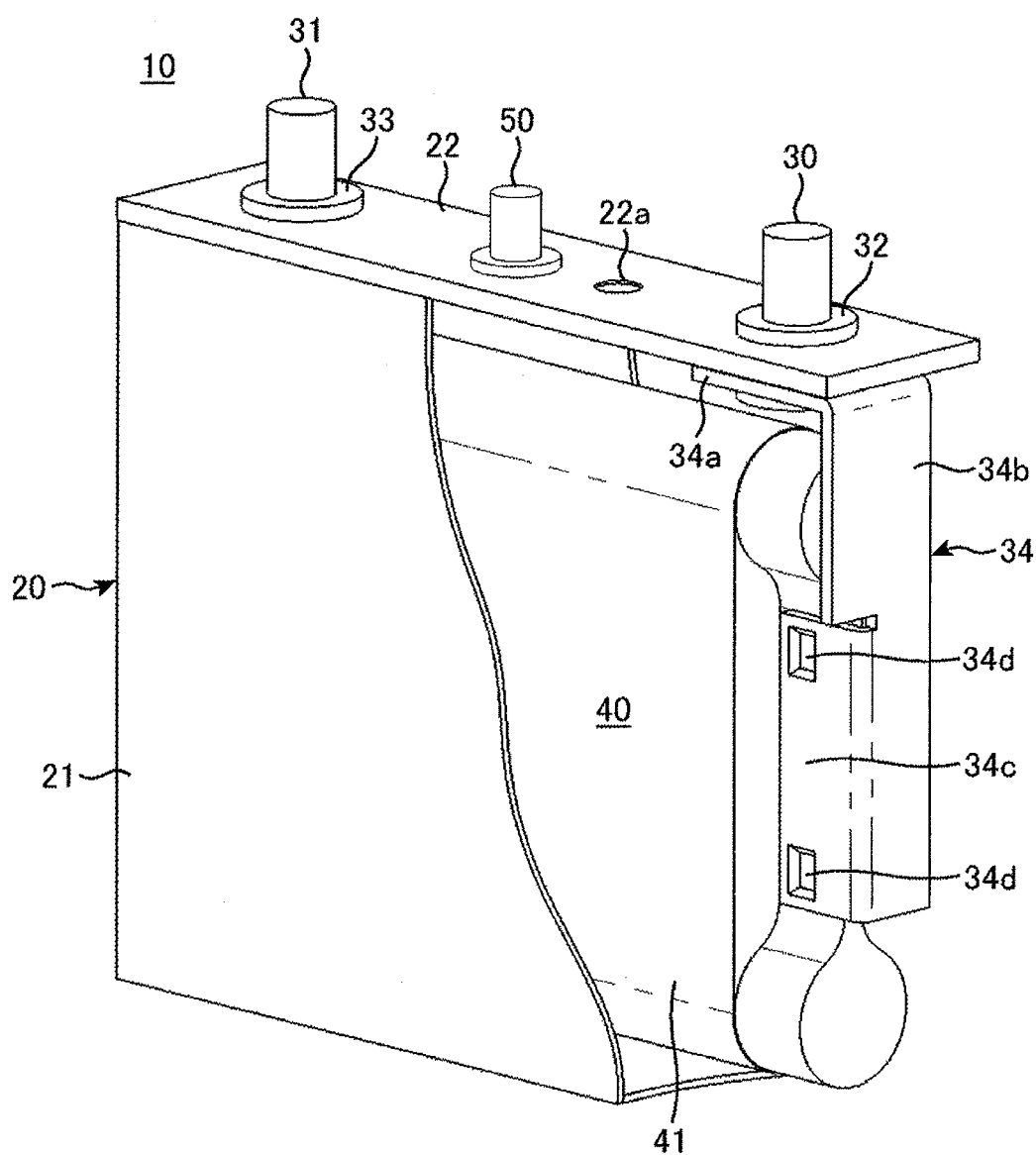
FIG. 2 is a partially cut out perspective view showing a configuration of a flattened prismatic battery cell adopted in FIG. 1 (embodiment 1).
Figure 3:
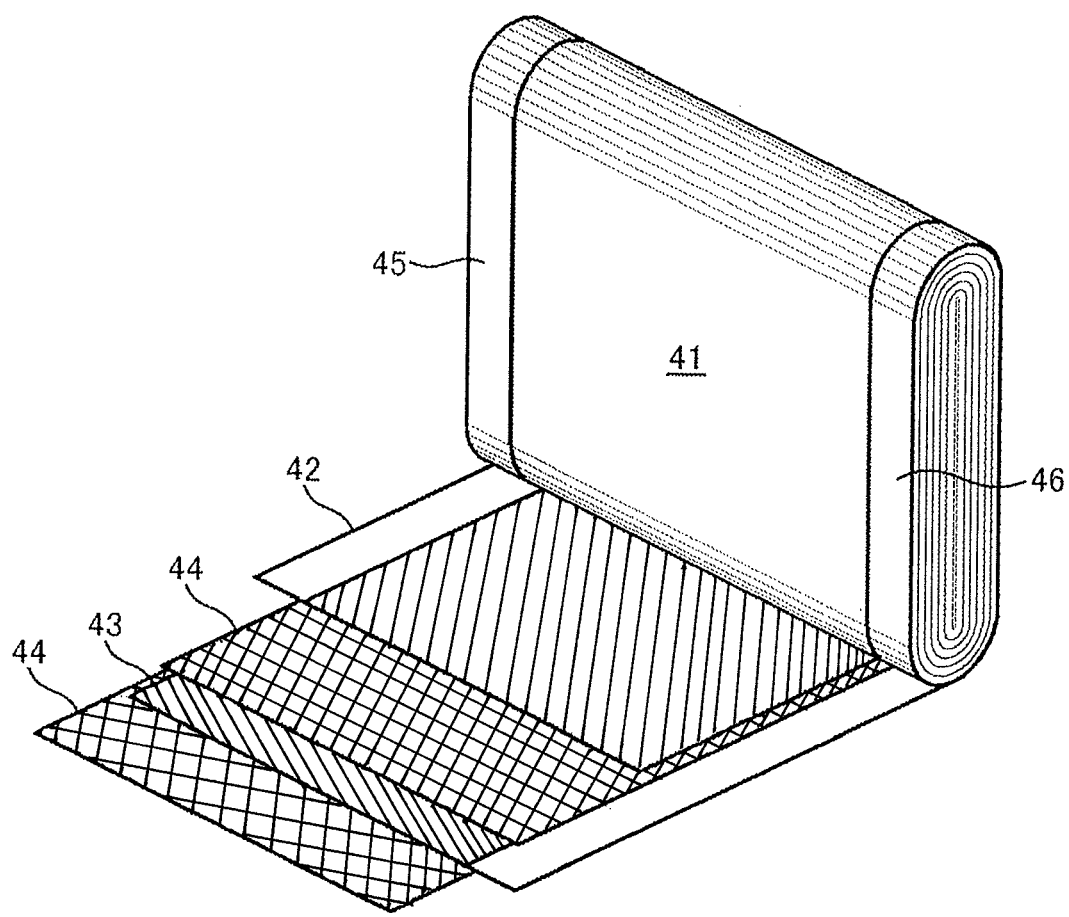
FIG. 3 is a perspective view showing a configuration of a electrode winding body stored in a battery case in FIG. 2 (embodiment 1).
Figure 4:
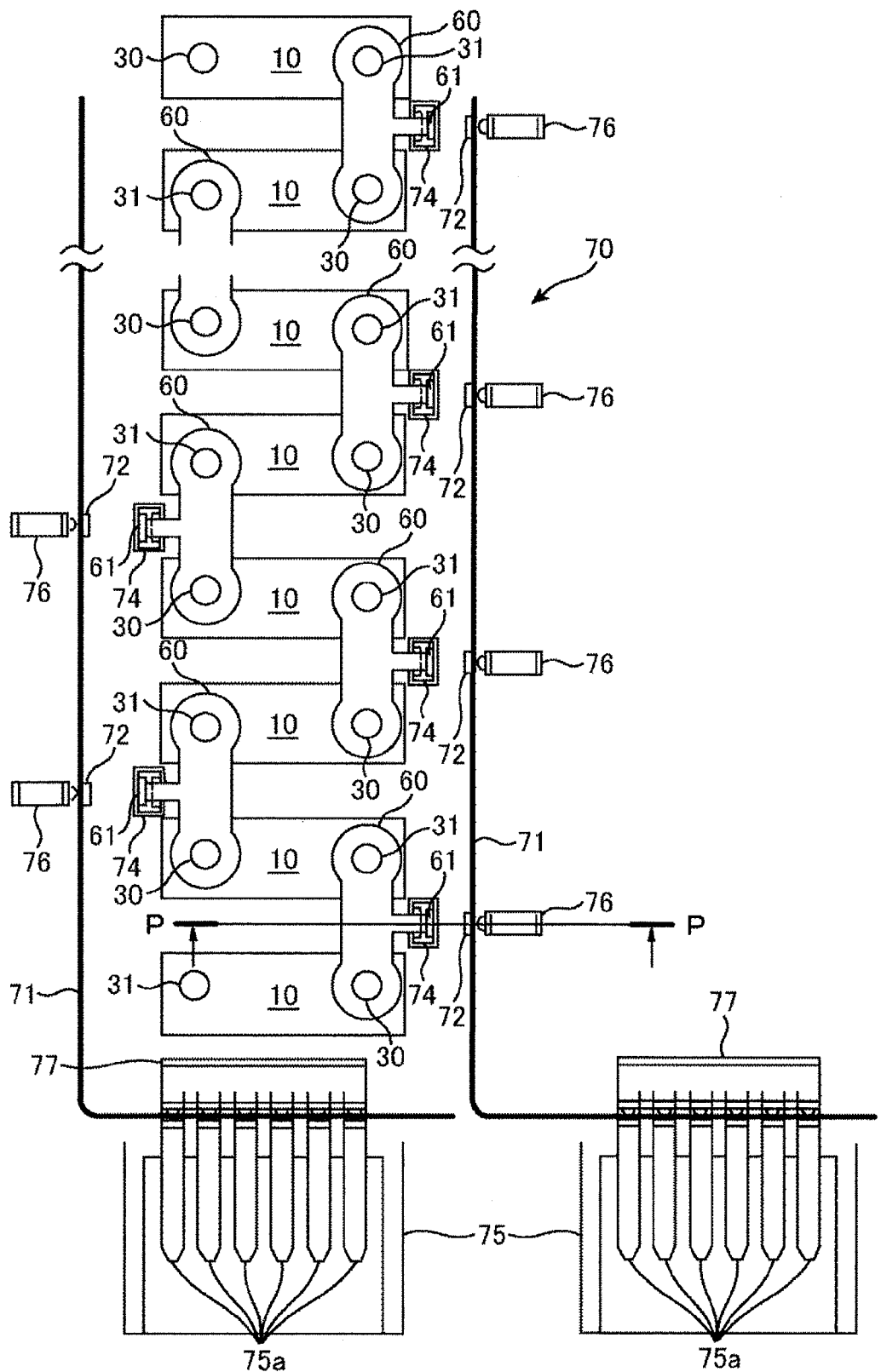
FIG. 4 is a plan view showing a configuration of battery module adopting the battery cells of FIG. 2 and a configuration of voltage detection line unit (embodiment 1).
Figure 5:
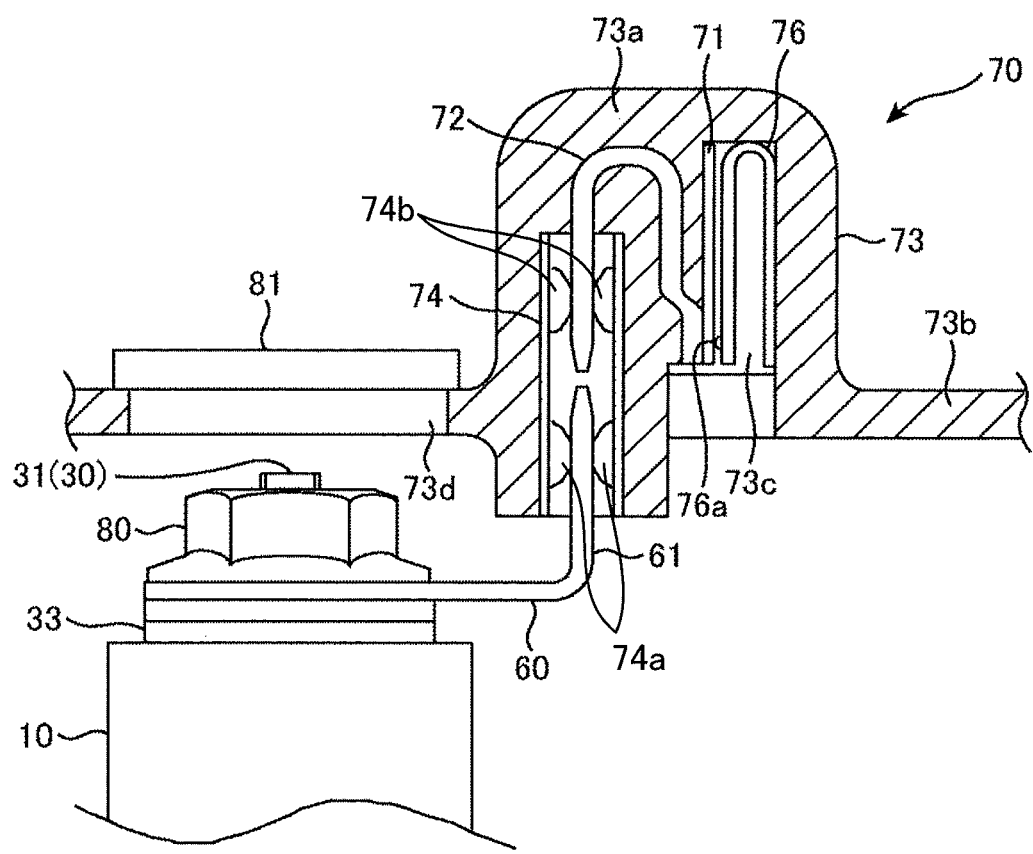
FIG. 5 is a sectional view of the voltage detection line unit taken along line P-P of FIG. 4 (embodiment 1).
Figure 6:
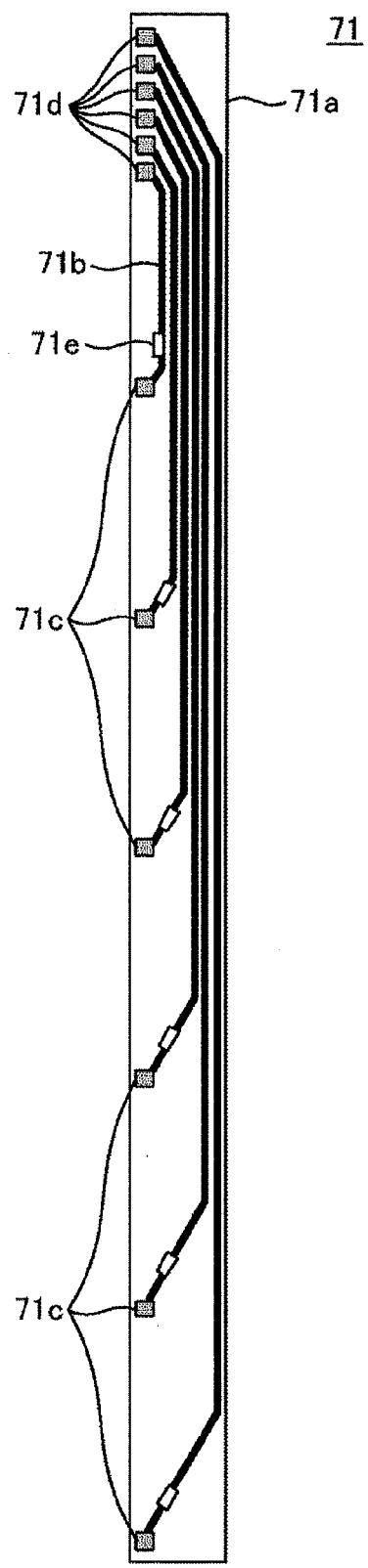
FIG. 6 is a plan view showing a configuration of a flexible printed circuit board in FIG. 4 (embodiment 1).
Figure 7:
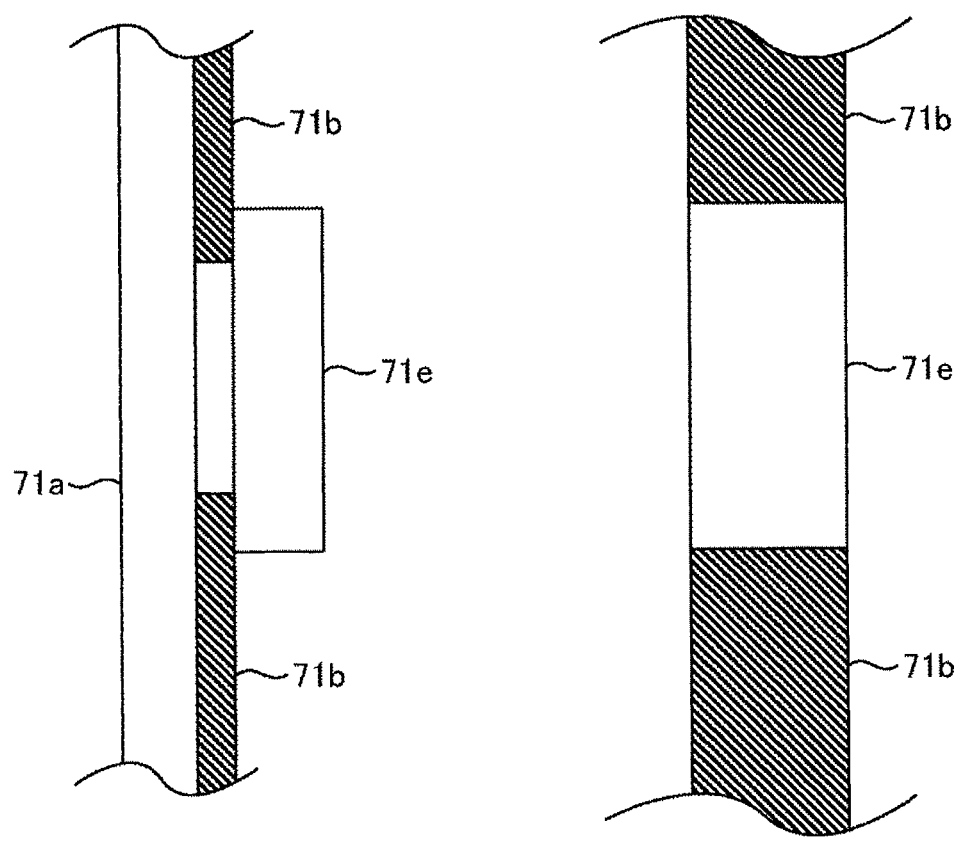
FIG. 7 is an enlarged view showing by enlarging a configuration of a fuse mechanism in FIG. 6 (embodiment 1).
Figure 8:
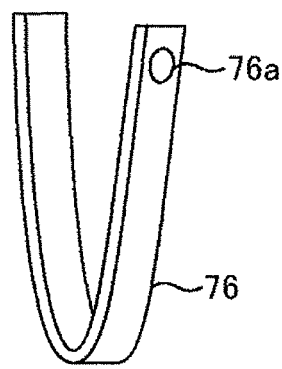
FIG. 8 is a perspective view showing a configuration of a U-shaped elastic member adopted at a battery cell side in FIG. 4 (embodiment 1).
Figure 9:
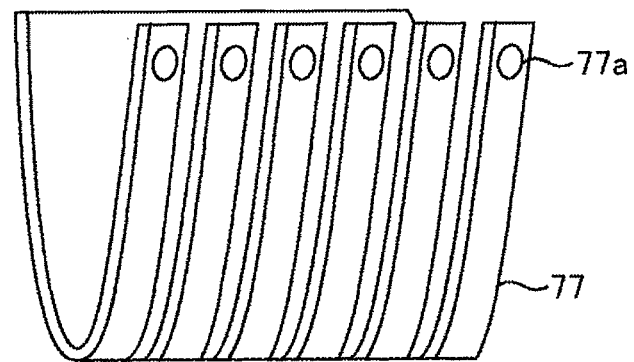
FIG. 9 is a perspective view showing a configuration of a U-shaped elastic member adopted at a connector side in FIG. 4 (embodiment 1).
Figure 10:
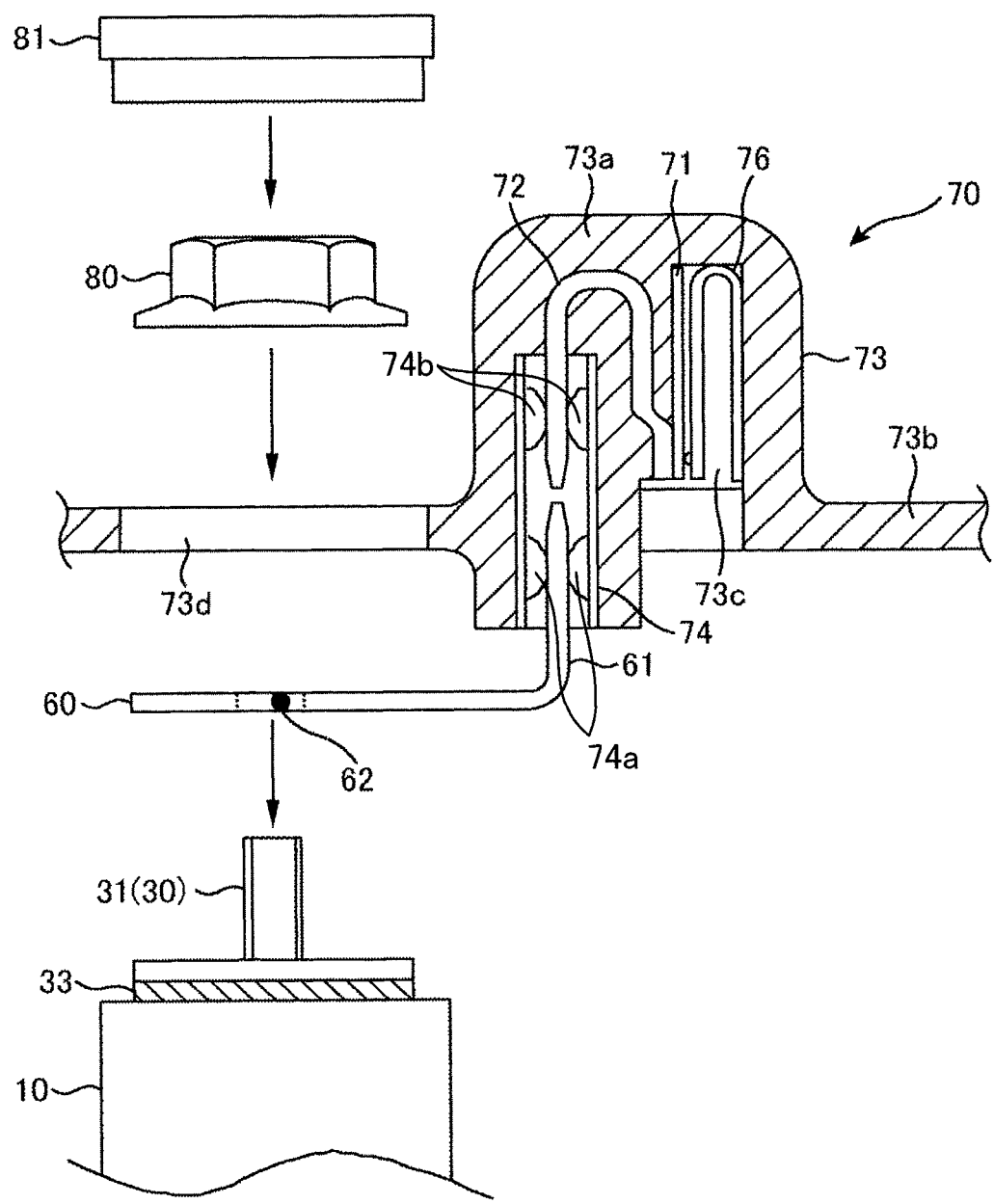
FIG. 10 is an exploded partially sectional view illustrating a procedure for assembling the voltage detection line unit of FIG. 5 (embodiment 1).

FIG. 2 shows an appearance and an internal configuration of the battery cell 10. FIG. 3 shows an external configuration of an electrode winding body 41. FIGS. 4 and 5 show the configuration of the battery module 110 having a configuration of arrangement of the plurality of the battery cells 10 and the configuration of a voltage detection line unit (voltage sensing line unit). FIG. 6 shows a configuration of a flexible printed circuit board configuring the voltage detection line unit. FIG. 7 shows a configuration of a fuse mechanism mounted on the flexible printed circuit board. FIG. 8 shows a configuration of a U-shaped elastic member used for connection between a voltage detecting conductor of the flexible printed circuit board and the voltage detection terminal in the voltage detection line unit. FIG. 9 shows a configuration of a U-shaped elastic member used for connection between the voltage detecting conductor of the flexible printed circuit board and a connector in the voltage detection line unit. FIG. 10 shows a way of connecting the voltage detection line unit to the battery cell 10.

In this embodiment, description will be made using an example of the battery module 110 including one assembled battery having a configuration where twelve battery cells 10 are arranged in a row.

Note that FIG. 4 shows an abbreviated view with only eight battery cells 10 without intermediate ones.

First the configuration of the battery cell 10 is described.

As shown in FIG. 2, the battery cell 10 is a flattened prismatic battery cell and includes a battery case (electrolytic bath) 20 having an enclosed flat rectangular parallelepiped shape. The battery case 20 includes two rectangular primary surfaces (e.g., top and bottom surfaces) with the largest areas disposed opposite to each other, and four rectangular secondary surfaces (two pairs of oppositely arranged side surfaces) that have areas smaller than those of the primary surfaces and are arranged perpendicular to the two primary surfaces along the four sides (edges) of each of the two primary surface. The battery case 20 is a hexahedron (flat prism) where the separation between the primary surfaces is shorter than each of the four sides of the primary surface, and configured with two components. One of the two components is a battery can 21 having a flat rectangular parallelepiped shape that includes the two primary surface and the three secondary surfaces, and has an opening at a part corresponding the remaining secondary surface. The other of the two components is a battery lid 22, which is a rectangular flat plate formed so as to seal the opening of the battery can 21 and the outline matches with that of the opening of the battery can 21. The battery can 21 and the battery lid 22 are joined together by laser beam welding. The battery case 20 (battery can 21 and the battery lid 22) is made of metal members. Aluminum or an alloy including aluminum as main ingredient is adopted as the material of the case.

In this embodiment, for the sake of simplicity of the description, it is defined that, irrespective of the mounting orientation of the battery cell 10, a side opposite to the opening of the battery can 21 which is a container with the flat rectangular parallelepiped shape is referred to as a bottom surface, two opposite surfaces arranged perpendicular to the bottom surface along the long sides of the bottom surface among the four surfaces arranged perpendicular to the bottom surface along the four sides of the bottom surface are referred to as first side surfaces, and two opposite surfaces arranged perpendicular to the bottom surface along the short sides of the bottom surface are referred to as second side surfaces. This definition will hereinafter be used in the description.

In this embodiment, for the sake of the description, it is defined that, in the component having a rectangular plane shape formed by two long sides arranged in parallel and opposite to each other and two short sides arranged in parallel, opposite to each other and perpendicular to the long sides, a direction extending in the direction identical to the long side (toward which the short sides are opposed) is referred to as a longitudinal direction, and a direction extending in the direction identical to the short sides (toward which the long sides are opposed) is referred to as a lateral direction. This definition will hereinafter be used in the description.

The battery lid 22 is provided with a positive electrode external terminal 30 and a negative electrode external terminal 31 for connection to an external conductor, which are external conductor connecting conductors, arranged so as to protrude from the outer surface to the outside.

The positive electrode external terminal 30 is disposed at one side end of the battery lid 22 in the longitudinal direction. The negative electrode external terminal 31 is disposed at the other side end of the battery lid 22 in the longitudinal direction. Between the battery lid 22 and the positive electrode side external terminal 30 there is arranged a positive electrode sealing member 32 for electrically insulating them and keeping the interior of the battery case 20 airtight and liquid-tight. Between the battery lid 22 and the negative electrode side external terminal 31 there is arranged a negative electrode sealing member 33 for electrically insulating them and keeping the interior of the battery case 20 airtight and liquid-tight. In the battery case 20, the positive electrode external terminal 30 is mechanically and electrically connected with a positive electrode connecting plate 34, which is an internal connecting conductor, by the positive electrode sealing member 32 in a state electrically insulated from battery lid 22. In the battery case 20, the negative electrode external terminal 31 is mechanically and electrically connected with a negative electrode connecting plate (not shown), which is an internal connecting conductor, by the negative electrode sealing member 33 in a state electrically insulated from the battery lid 22. Thus, the positive electrode external terminal 30 and the negative electrode external terminal 31 are electrically insulated from the battery case 20. This keeps the battery case 20 in an electrically neutral state, that is, a state without potential.

The positive electrode external terminal 30 is a cylindrical metal member; aluminum or an alloy including aluminum as main ingredient is adopted as the material thereof. The negative electrode external terminal 31 is a cylindrical metal member; copper or an alloy including copper as main ingredient is adopted as the material thereof. The positive electrode sealing member 32 and the negative electrode sealing member 33 are members made of an electrically insulating resin; polyphenylene sulfide (PPS) or polybutylene terephthalate (PBT) or perfluoro-alkoxy fluoro (PFA) is adopted as the material thereof. The positive electrode connecting plate 34 is a metal compact formed from a flat plate into in a prescribed shape; aluminum or an alloy including aluminum as main ingredient is adopted as the material thereof. The negative electrode connecting plate has a shape identical to that of the positive electrode connecting plate 34, and is a metal compact formed from a flat plate into in a prescribed shape; copper or an alloy including copper as main ingredient is adopted as the material thereof.

A generating element 40 is housed in the battery case 20 (battery can 21). The generating element 40 is inserted into the battery can 21 through the opening of the battery can 21. An electrolytic solution is injected into the battery case 20 (battery can 21) through a liquid injecting hole 22a provided at the battery lid 22. The liquid injecting hole 22a is a through hole penetrating battery lid 22 from the outer surface to the inner surface thereof. After the electrolytic solution has been injected into the battery case 20, the liquid injecting hole 22a is sealed by laser beam welding in an airtight and liquid-tight manner.

An electrolytic solution may be, for example, a nonaqueous organic solvent where 1 mol/L of lithium hexafluorophosphate ($LiPF_6$) is dissolved in mixed solution containing 1:1:1 by volume of ethylene carbonate (EC), dimethyl carbonate (DMC) and diethyl carbonate (DEC).

Note that, as the electrolyte, $LiClO_4$, $LiAsF_6$, $LiBF_4$, $LiB(C_6H_5)_4$, $CH_3SO_3Li$, $CF_3SOLi$ or mixture thereof may be adopted. Further, the nonaqueous electrolytic solution may be mixed solvent containing at least one of propylene carbonate, ethylene carbonate, diethyl carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methyl sulfolane, acetonitrile, propionitrile, and the like.

As shown in FIG. 3, the generating element 40 includes an electrode winding body 41 configured with a sheet-like laminated body wound into a flat shape. This laminated body includes a separator 44, a negative electrode plate 43, a separator 44 and a positive electrode plate 42 which are stacked together in this order.

In this embodiment, the description is made using an example adopting the electrode winding body 41 with a wound configuration. However, a laminated electrode body with the positive electrode plate 42, the negative electrode plate 43 and the separator 44 having been processed into rectangular shaped sheets and stacked according to an order analogous to the above order in a multilayered manner, may be adopted instead.

In this embodiment, for the sake of description, it is defined that the winding direction of the electrode winding body 41 is referred to as an electrode winding direction, a direction orthogonal to the electrode winding direction in a flat winding surface of the electrode winding body 41 is referred to as an electrode width direction, and a direction perpendicularly penetrating the flat winding surface of the electrode winding body 41 is referred to as a the electrode flat direction. The definition will hereinafter be used.

Further, in this embodiment, for the sake of description, it is defined that a direction of the electrode plate identical to the electrode winding direction is referred to as a plate winding direction, a direction of the electrode plate identical to the electrode width direction is referred to as a plate width direction, and a direction of the electrode plate identical to the electrode flat direction is referred to as a plate perpendicular direction. The definition will hereinafter be used in the description.

The positive electrode plate 42 is configured by applying positive electrode active material mixture on a positive electrode collector foil such that an unapplied part 45 without application of the positive electrode active material mixture is left at one end part in the plate width direction. The positive electrode collector foil is, for example, a strip of aluminum foil (aluminum plate) with a thickness of 20 μm. The positive electrode active material mixture is prepared by adding 10 parts by weight of flake graphite as conductor and 10 parts by weight of polyvinylidene difluoride (PVDF) as binder to 100 parts by weight of a stoichiometric composition of lithium-manganese dioxide (chemical formula: $LiMnO_2$) as positive electrode active material, further adding thereto N-methylpyrrolidone (NMP) as dispersion medium, and mixing them together. This mixture is substantially evenly and uniformly applied on the both surface of the aluminum foil (aluminum plate).

The negative electrode plate 43 is configured by applying negative electrode active material mixture on a negative electrode collector foil such that an unapplied part 46 without application of the negative electrode active material mixture is left at the other end part in the plate width direction. The negative electrode collector foil may be, for example, a strip of a copper foil (copper plate) with a thickness of 10 μm. The negative electrode active material mixture is prepared by adding 10 parts by weight of polyvinylidene difluoride (PVDF) as binder to 100 parts by weight of amorphous carbon powder as negative electrode active material, further adding N-methylpyrrolidone (NMP) as dispersion medium, and kneading them together. This mixture is substantially evenly and uniformly applied on the both surface of the copper foil (copper plate).

The positive electrode active material may be a material into and from which lithium ions can be inserted and eliminated. A lithium-transition metal composite oxide with a sufficient amount of lithium ions preliminarily inserted thereinto, or a material where lithium in a crystal of a lithium-transition metal composite oxide or a part of a transition metal is substituted with an element other than those or doped with this element may be used. For example, this may be another lithium-manganese oxide with a spinel crystal structure (e.g. $Li_1+xMn_2-xO_4$), a lithium-manganese composite oxide where a part of lithium-manganese oxide is substituted with a metallic element or doped with this element (e.g. $Li_1+xMyMn_2-x-yO_4$, where M is at least one of Co, Ni, Fe, Cu, Al, Cr, Mg, Zn, V, Ga, B and F), a lithium cobalt oxide and a lithium titanate having laminate crystal structures, and a lithium-metal composite oxide where a part of these is substituted with a metallic element or doped with this element. The crystal structure may be any one of spinel, laminate and olivine structures.

The negative electrode active material may be any one of a natural graphite into and from which lithium ions can be inserted and eliminated, various artificial graphite materials, carbonaceous materials such as a coke. The shape of powder may be any one of a flake, a grain, a fiber and a lump.

The binder may be polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various types of latex, acrylonitrile, vinyl fluoride, vinylidene fluoride, propylene fluoride, chloroprene fluoride, polymers such as acrylic resin, and mixture thereof.

The separator 44 prevents the positive electrode plate 42 and the negative electrode plate 43 from being directly contact with each other. That is, the separator 44 is a microporous member for electronically insulating the positive electrode plate 42 and the negative electrode plate 43, and may be for example a strip member made of polyethylene prepared by drawn by a uniaxial drawing machine to a thickness of 30 μm. The separator 44 is formed to have a dimension in the plate width direction smaller than a dimension in the plate width direction of the positive electrode plate 42 and that of the negative electrode plate 43

In the electrode winding body 41, the unapplied part 45 of the positive electrode plate 42 and the unapplied part 46 of the negative electrode plate 43 are disposed oppositely to each other. More specifically, the positive electrode plate 42 and the negative electrode plate 43 are displaced from each other in opposite orientations in the electrode width direction of the electrode winding body 41 and stacked together such that the unapplied part 45 of the positive electrode plate 42 is disposed at one side of the electrode winding body 41 in the electrode width direction and the unapplied part 46 of the negative electrode plate 43 is disposed at the other side thereof. This configuration allows the electrode winding body 41 to be formed such that the unapplied parts 45 and 46, which are to be after-mentioned collector foils, lie (exposed) off a main part of the electrode winding body 41 (stacked part of active material mixture application part of the positive electrode plate 42 and the negative electrode plate 43 and the separator 44).

When the laminated body including the positive electrode plate 42 and the negative electrode plate 43 is wound, only the separator 44 is further wound additional two to three times at start and finish portions of winding of the laminated body including the positive electrode plate 42 and the negative electrode plate 43. When the positive electrode plate 42 and the negative electrode plate 43 are wound, it is set such that the negative electrode plate 43 is longer in length than the positive electrode plate 42, thereby preventing the positive electrode plate 42 from extending further than the negative electrode plate 43 in the winding direction at the innermost and outermost portions of the electrode winding body 41.

The thus formed electrode winding body 41 is flatly pressed at the center part of unapplied parts 45 and 46 in the electrode winding direction from both sides of the electrode flat direction (from outer parts of the electrode winding body) to the center of winding of the electrode (inner diameter side of the electrode winding body). This produces the generating element 40.

Concave portions are formed on both sides in the electrode flat direction at one electrode width direction side end portion of the electrode winding body 41. The concave portion includes: a rectangular flat portion formed at a center portion in the electrode winding direction (a flat portion formed such that the electrode winding direction is the longitudinal direction, the electrode winding width direction is the lateral direction); a first slant portion that is gradually slanted from one side of the electrode winding direction (one side of turnaround portion) to the other side thereof toward the inner diameter side of the electrode winding body 41 and reaches the one electrode winding direction side end of the flat portion; a second slant portion that is gradually slanted from the other side of the electrode winding direction (the other side of the turnaround portion) to the one side toward the inner diameter side of the electrode winding body 41 and reaches the electrode winding direction the other side end of the flat portion; and a third slant portion that is gradually slanted from the one electrode width direction side end of a portion of the electrode winding body 41 with application of the active material to the other side end of the flat portion in the electrode width direction toward the inner diameter side of the electrode winding body 41 and reaches the other electrode width direction side end of the flat portion. This forms a positive electrode current collector at the one electrode width direction side end of the electrode winding body 41.

Concave portions are formed on both sides in the electrode flat direction at the other electrode width direction side end portion of the electrode winding body 41. The concave portion includes: a flat portion formed as with the positive electrode current collector; a first slant portion formed as with the positive electrode current collector; a second slant portion formed as with the positive electrode current collector; and a fourth slant portion that is gradually slanted from the other electrode width direction side end of a portion of the electrode winding body 41 with application of the active material to the one side end of the flat portion in the electrode width direction toward the inner diameter side of the electrode winding body 41 and reaches the one electrode width direction side end of the flat portion. This forms a negative electrode current collector at the other electrode width direction side end of the electrode winding body 41.

The positive electrode current collector and the negative electrode current collector are laterally symmetrical with each other. Both have similar configuration.

The thus manufactured generating element 40 is attached to a battery lid assembly, having preliminarily been assembled so as to mechanically integrating the battery lid 22, the positive electrode external terminal 30 and the negative electrode external terminal 31, the positive electrode sealing member 32 and the negative electrode sealing member 33, the positive electrode connecting plate 34 and the negative electrode connecting plate, such that one side of the winding turnaround portions formed at both end portions of the generating element 40 in the electrode winding direction along the electrode width direction of the generating element 40 is opposed to the inner surface of the battery lid 22 along the longitudinal direction of the battery lid 22. Subsequently, the positive electrode connecting plate 34 and the negative electrode connecting plate are joined to the positive electrode current collector and the negative electrode current collector, respectively, by ultrasonic welding. Accordingly, the positive electrode plate 42 of the generating element 40 and the positive electrode external terminal 30 are electrically connected to each other; the negative electrode plate 43 of the generating element 40 and the negative electrode external terminal 31 are electrically connected to each other.

The positive electrode connecting plate 34 and the negative electrode connecting plate are different in material from each other, but components and shapes thereof are identical. Accordingly, the description will hereinafter be made typically exemplifying the positive electrode connecting plate 34.

The positive electrode connecting plate 34 is an integrally formed body including three elements, which are a terminal connecting portion 34a, a side surface 34b and a connecting piece 34c. A flat plate is formed into a prescribed shape to produce the integrally formed body. The integrally formed body thus including the plurality of elements is used as a connecting plate, thereby allowing the positive electrode connecting plate 34 to be improved in strength and rigidity.

The terminal connecting portion 34a is a rectangular metal piece (flat plate) mechanically connected to the positive electrode external terminal 30. The terminal connecting portion 34a is arranged such that the flat surface is opposed to the inner surface of the battery lid 22 and one side of the winding turnaround portion of the generating element 40, and extends along the inner surface of the battery lid 22 and one side of the winding turnaround portion of the generating element 40 in the direction identical to the longitudinal direction of the battery lid 22 and the electrode width direction of the generating element 40, and the longitudinal direction is identical to the longitudinal direction of the battery lid 22 and the electrode width direction of the generating element 40. The terminal connecting portion 34a is attached to the battery lid 22 via the positive electrode sealing member 32.

The side surface 34b is a rectangular metal piece (flat plate) integrally formed from one end portion (on a side opposite to the negative electrode external terminal 31) of the terminal connecting portion 34a in the longitudinal direction. The side surface 34b is bent from the one side end of the terminal connecting portion 34a in the longitudinal direction toward the bottom surface of the battery can 21 at a prescribed curvature, and arranged such that the flat surface is opposed to the inner part of the second side surface of the battery can 21 and the positive electrode side end portion of the generating element 40 in the electrode width direction, extends along the inner part of the second side surface of the battery can 21 and the positive electrode side end portion of the generating element 40 in the electrode width direction toward the bottom surface of the battery can 21, and the longitudinal direction is oriented to a direction identical to the longitudinal direction of the second side surface of the battery can 21 and the electrode winding direction of the generating element 40. The side end of the side surface 34b opposite to the side of the terminal connecting portion 34a extends up to a position corresponding to the end portion on the other side in the longitudinal direction of the positive electrode current collector of the generating element 40 (the other side of the winding turnaround portion of the generating element 40).

The connecting piece 34c is a rectangular metal piece (flat plate) integrally formed from the edge of one side end of the side surface 34b in the lateral direction. The connecting piece 34c is bent at a substantially right angle with a prescribed curvature from one side end of the side surface 34b in the lateral direction and the edge of a portion reaching a position corresponding to the one end portion (one side of the winding turnaround portion of the generating element 40) of the positive electrode current collector of the generating element 40 in the longitudinal direction toward the generating element 40, the flat surface is opposed to the positive electrode current collector of the generating element 40 and extends toward the generating element 40, and the longitudinal direction is identical to the longitudinal direction of the second side surface of the battery can 21 and the electrode winding direction of the generating element 40. Welded parts 34d for joining the connecting piece 34c to the positive electrode current collector by ultrasonic welding are formed at two positions at opposite ends of the longitudinal direction of the connecting piece 34c. The welded part 34d is a thin portion formed by indenting the flat surface of the connecting piece 34c to be thinner than other portions.

After the positive electrode connecting plate 34 and the negative electrode connecting plate are joined to the generating element 40 by ultrasonic welding, the assembly of the generating element 40 and the battery lid assembly are inserted into the battery can 21 through the opening of the battery can 21 while the generating element 40 is mechanically supported by the battery lid 22 and the other one of the winding turnaround portions of the generating element 40 is an inserting side. Accordingly, the generating element 40 is housed in the battery can 21 and in a state of being suspended from the battery lid 22. In this case, the extending direction of the material of the separator 44 is identical to lateral direction of the primary surface of the battery can 21.

After the battery lid 22 is joined to the battery can 21, the electrolytic solution is injected into the battery case 20 through the liquid injecting hole 22a, which is provided closer to the positive electrode external terminal 30 than the center of the battery lid 22 in the longitudinal direction. After injection of the electrolytic solution, the liquid injecting hole 22a is sealed by laser beam welding in an airtight and liquid-tight manner.

A gas discharge valve is provided in the battery cell 10. The gas discharge valve is a safety valve that, when some type of abnormality has occurred at the battery cell 10 and the electrolytic solution is vaporized to increase the internal pressure, actuates by a prescribed internal pressure to release the gas in a mist state to the outside of the battery cell 10 and thus protect the battery cell 10. At a center of the battery lid 22 in the longitudinal direction there is provided a gas discharge pipe 50 for guiding the gas generated in the battery case 20 when the gas discharge valve is opened from the inside of the battery case 20 to the outside.

Next, the configuration of the battery module 110 including twelve battery cells 10 (FIG. 4 shows an abbreviated view with only eight battery cells 10 without intermediate ones) is described.

The battery cell 10 is installed in an elevated manner where the battery lid 22 provided with the positive electrode external terminal 30 and the negative electrode external terminal 31 is the top surface and the bottom surface of the battery can 21 opposite to the battery lid 22 is the installation surface. In the battery module 110, the battery cells 10 installed in the elevated manner and cell holders (not shown) that provide cooling medium (air) and hold the battery cells 10 are tied in an alternate arrangement in a row. The battery cells 10 adjacent to each other in the arrangement direction via the cell holder are rotationally symmetric, or virtually matching by turning of 180 degrees, with respect to the symmetry axis of rotation of the central axis extending to a direction in which the battery lid 22 of the battery cell 10 and the bottom surface of the battery can 21 are opposed to each other. Accordingly, as for the battery cells 10 adjacent to each other in the arrangement direction via the cell holder, the arrangements of the positive electrode external terminals 30 and the negative electrode external terminals 31 are oriented in a reversed manner.

The arrangement body of the battery cells 10 and the cell holders are strongly fixed by a fixing force such as a screw fixing force applied from both side in the arrangement direction. This configuration improves resistance against external vibrations and external impacts, thereby allowing the battery cell 10 to be protected from the external forces.

The positive electrode external terminal 30 of one of the battery cells 10 adjacent to each other in the arrangement direction via the cell holder and the negative electrode external terminal 31 of the other one thereof are mechanically and electrically connected to each other by a bus bar 60. Thus, sequentially from the battery cell 10 arranged at the one side end in the arrangement direction to the battery cell 10 arranged at the other side end in the arrangement direction, the negative electrode external terminal 31 of the preceding battery cell 10 and the positive electrode external terminal 30 of the subsequent battery cell 10 are connected to each other by the bus bar 60. Accordingly, the twelve battery cells 10 are electrically connected in series from the battery cell 10 arranged at the one side end in the arrangement direction to the battery cell 10 arranged at the other side end in the arrangement direction in a sequential manner.

A cooling medium flow path configured with the cell holder and the primary surface of the battery can 21 is formed between the battery cells 10 adjacent to each other in the arrangement direction via the cell holder. The cooling medium flow path is arranged such that the cooling medium flows along the primary surface of the battery can 21 from one side end of the battery can 21 in the longitudinal or lateral direction to the other side end or in a reversed manner. The cooling air as the cooling medium is supplied and discharged by a cooling fan, which is not shown.

In this embodiment, the description is made using the example of cooling the battery cell 10 by means of cooling air. However, another gaseous cooling medium such as inert gas may be adopted, or liquid cooling medium such as antifreeze. Contrary to the case of gaseous cooling medium, in a case of adopting the liquid cooling medium, the medium is not directly applied to the surface of the battery can 21, a highly thermally conductive flow path structure through which the medium flows is located on the surface (bottom or primary surface) of the battery can 21 and indirectly cools the battery cell 10.

Although not shown, at the center portion of the arrangement body of the battery cell 10 in a direction orthogonal to the arrangement direction, the gas discharge pipes 50 arranged at the center of the battery lid 22 in the longitudinal direction are disposed in a row in the arrangement direction of the arrangement body. A gas discharge duct provided in common for the twelve battery cells 10 and extends in the arrangement direction of the battery cells 10 is communicated with the gas discharge pipes 50. This allows the gas discharged from the battery cells 10 through the gas discharge pipes 50 to be discharged to the outside of the battery module 110 (out of the PHEV 1) in a manner separated from the space where the cooling medium flows.

There is no problem if the gas discharged from the battery cell 10 is discharged together with the cooling medium out of the battery module 110. It may appropriately be selected whether the gas discharged from the battery cells 10 is to flow with the cooling medium or be separated therefrom or not, according to an installation place of the battery module 110 in a vehicle and the like. For example, in a case of arranging the battery module 110 in the passenger room and cooling the battery module 110 by air introduced into the passenger room, it is preferable to separate the cooling medium and the discharged gas from each other.

A plurality of the thus configured battery modules 110, the number of which is according to drive voltage for the motor/generator 200, are electrically connected in series or parallel or series/parallel and used as drive power supply for the motor/generator 200. The status of the battery module 110 is managed and controlled by the cell controller 120 electrically connected to the battery cell 10 and the battery controller 130 connected to the cell controller 120 via the signal transmitting circuit. The cell controllers 120 are provided for supporting respective battery modules 110, and arranged close to the respective battery module 110. The battery controller 130 is provided in common to the cell controllers 120 arranged for supporting the respective battery modules 110, and transmits and receives signals to and from the cell controllers 120 via a loop or parallel signal transmitting circuit.

Next, referring to FIGS. 4 to 9, configuration for detecting voltage of the battery cell 10 will be described.

As described above, the battery cells 10 and the cell controller 120 are electrically connected to each other.

This is for detecting the terminal voltage of each battery cell 10 and monitors the status of each battery cell 10. Accordingly, a voltage detection line for capturing the voltage of the battery cell 10 into the cell controller 120 is provided between the battery cell 10 and the cell controller 120. Typically, a lead wiring and wirings provided at the printed circuit board (rigid circuit board) or the flexible printed circuit board are welded to the bus bar 60 electrically connecting battery cells 10 are used as the voltage detection line. In contrast thereto, in this embodiment, a voltage detection line unit 70 including a voltage detection line 71 is configured. The voltage detection line unit 70 and the bus bar 60 are integrated. Accordingly, when the bus bar 60 is mechanically connected to the positive electrode external terminal 30 or the negative electrode external terminal 31 of the one of the battery cells 10 adjacent to each other in the arrangement direction of the battery cells 10 and the negative electrode external terminal 31 or the positive electrode external terminal 30 of the other one of the battery cells 10, the voltage detection line 71 is electrically connected to the positive electrode external terminal 30 or the negative electrode external terminal 31 of the one of the battery cells 10 adjacent to each other in the arrangement direction of the battery cells 10 and the negative electrode external terminal 31 or the positive electrode external terminal 30 of the other one of the battery cells 10.

As shown in FIG. 4, the respective voltage detection line units 70 are separately arranged for supporting the arrangement body of the positive electrode external terminal 30 and the negative electrode external terminal 31 disposed at one side end of the battery module 110 in the direction orthogonal to the arrangement direction of the battery cell 10 and the arrangement body of the positive electrode external terminal 30 and the negative electrode external terminal 31 disposed at the other side end of the battery module 110.

In this embodiment, the description is made using the example of separately arranging voltage detection line units 70 for respective terminal arrangements. These voltage detection line units 70 may be integrated and establish a one-to-one relationship between the battery module 110 and the voltage detection line unit 70.

Further, in this embodiment, the voltage detection line 71 of the voltage detection unit 70 is also electrically connected to the positive electrode external terminal 30 of the battery cell 10 arranged in one side end in the arrangement direction of the battery cells 10 and the negative electrode external terminal 31 of the battery cell 10 arranged at the other side end. However, this is not shown in FIG. 4.

Although the detailed illustration is omitted in FIG. 2, as shown in FIG. 10, the positive electrode external terminal 30 and the negative electrode external terminal 31 of the battery cell 10 are metallic conductive members that are configured by integrating a cylindrical-shaped protrusion and a disk-shaped flange provided at the bottom surface of the protrusion (toward the sealing member) and have an inverted T shape in a sectional view.

A screw groove is formed on the outer surface of the protrusion.

The bus bar 60 is a metallic conductive member that has a flat plate-like shape and extends in the arrangement direction of the battery cells 10. The bus bar 60 is an eyeglasses-shaped metallic conductive member configured by integrating toroidal disks disposed at opposite ends in the arrangement direction of the battery cell 10 and a rectangular part connecting the toroidal disks. The toroidal disks of the bus bar 60 are formed in a size identical to that of the flanges of the positive electrode external terminal 30 and the negative electrode external terminal 31. A bus bar terminal 61 is provided at one side end of the rectangular part of the bus bar 60 in a direction orthogonal to the longitudinal direction. The bus bar terminal 61 extends from the edge of the one side end of the rectangular part of the bus bar 60 in the direction orthogonal to the longitudinal direction along one sense in the direction orthogonal to the longitudinal direction of the rectangular part of the bus bar 60 (opposite to the terminal) by a prescribed distance (up to a position further outside than the position of the end of the battery can 21), bent at a prescribed curvature, and further extends along one sense in the direction orthogonal to the flat surface of the bus bar 60 (in the same direction along which the protrusion of the terminal protrudes) up to a position higher than that of the protruding distal end of the protrusion of the terminal. The bus bar terminal 61 is formed integrally with the bus bar 60. A bus bar attaching hole 62 is formed at the center of the toroidal disk of the bus bar 60. The bus bar attaching holes 62 are through holes through which the protrusions of the positive electrode external terminal 30 and the negative electrode external terminal 31 of the battery cell 10 are inserted. Here, provided that the outer diameter of the protrusion of each of the positive electrode external terminal 30 and the negative electrode external terminal 31 of the battery cell 10 is ϕd and the inner diameter of the bus bar attaching hole 62 is ϕD, there is a relationship of ϕD>ϕd. This relationship facilitates the bus bar 60 to be engaged with the positive electrode external terminal 30 and the negative electrode external terminal 31 of the battery cell 10. This configuration facilitates assembly of the battery module 110, and enables the assembly workability of the battery module 110 to be improved.

The voltage detection line unit 70 includes, as its components, the voltage detection line 71, the voltage detection terminal 72, an insulator resin (plastic) cover 73, a female-female relay terminal 74, a connector 75, a U-shaped elastic member 76 for the voltage detection terminal, and a U-shaped elastic member 77 for the connector terminal.

As shown in FIG. 6, the voltage detection line 71 includes one flexible printed circuit board 71a, six voltage detecting conductors 71b, six conductive pads 71c for the voltage detection terminals, six conductive pads 71d for the connector terminals, and six fuses 71e. The six voltage detecting conductors 71b may be referred to as six voltage detection lines (sensing lines).

In this embodiment, the configuration of the voltage detection line unit 70 arranged at the right-hand part of the FIG. 4. The basic configuration of the voltage detection line unit 70 arranged in the left-hand part is identical to that of the voltage detection line unit 70 arranged in the right-hand part. There may be a case where the length of the flexible printed circuit board 71a, and the number and position of the voltage detecting conductors 71b, the conductive pads 71c for the voltage detection terminals, the conductive pads 71d for the connector terminals and the fuses 71e are different.

The flexible printed circuit board 71a a rectangular insulating film (insulator film), which is electrically insulative, and adopts for example polyimide or photo solder resist as the material. The voltage detecting conductor 71b, the conductive pad 71c for the voltage detection terminal and the conductive pad 71d for the connector terminal are printed on the same surface on one side of the flexible printed circuit board 71a. The voltage detecting conductor 71b, the conductive pad 71c for the voltage detection terminal and the conductive pad 71d for the connector terminal are foil-like conductive members made of metallic material, such as copper or carbon as the material.

The six conductive pads 71d for the connector terminals are arranged in a row along the longitudinal direction in an intensive or closely arranged manner at one side end of the flexible printed circuit board 71a in the lateral direction and about one side end in the longitudinal direction. The six conductive pads 71c for the voltage detection terminals are arranged in a row in the longitudinal direction with a separation according to the arrangement position of the bus bar terminal 61 at the one side end of the flexible printed circuit board 71a in the lateral direction. The six voltage detecting conductors 71b extend in the longitudinal direction in parallel with the lateral direction so as to connect respective pairs of the corresponding conductive pads 71d for the connector terminals and the corresponding conductive pad 71c for the voltage detection terminals, and are connected to the corresponding conductive pad 71d for the connector terminals and the corresponding conductive pads 71c for the voltage detection terminals. Note that the voltage detecting conductor 71b is physically broken at a part where an after-mentioned fuse 71e is provided. However, the part is electrically connected by the fuse 71e.

As shown in FIG. 7 in an enlarged view, the fuse 71e is provided in the proximity of each of the conductive pads 71c for the voltage detection terminals of the six voltage detecting conductors 71b. The fuse 71e is a conductive member that configures an electrical path from the conductive pad 71c for the voltage detection terminal to the conductive pad 71d for the connector terminal together with the voltage detecting conductor 71b. In case of abnormality of the battery cell 10 that causes abnormal current exceeding the rated current passing from the battery cell 10 to the voltage detection line unit 70, the fuse 71e itself melts and opens by Joule heat caused by the abnormal current. Thus, the fuse 71e is a film-like current breaking member that breaks the electrical path from the conductive pad 71c for the voltage detection terminal to the conductive pad 71d for the connector terminal.

In this embodiment, the description is made using the example of adopting the fuse 71e as the current breaking member. However, a PTC thermistor or the like may be adopted instead of the fuse 71e.

The distal end of the bus bar terminal 61 is inserted into a female slot of the female-female relay terminal 74 (hereinafter, simply described as "relay terminal 74") at one side end, and mechanically and electrically connected to the relay terminal 74. The relay terminal 74 is a conductive tubular member having a rectangular parallelepiped (or prism) shape and formed in a tube-like manner (hollow), whose opposite side ends in the longitudinal direction are open as the female slots. Pairs of hemispherically shaped protrusions 74a and 74b that are spaced and arranged opposite from and to each other are provided on the inner surface at the opposite ends of the relay terminal 74 in the longitudinal direction. The separation between portions most close to opposite side of the protrusions 74a and 74b to each other is smaller than the thickness of each of the bus bar terminal 61 and the voltage detection terminal 72. The bus bar terminal 61 is electrically connected to relay terminal 74 by inserting the distal end into the relay terminal 74 from the female slot of the relay terminal 74 at one side end to be sandwiched between the protrusions 74a and be pressed against the protrusions 74a in a fixed state.

One of the distal ends of the voltage detection terminal 72 is mechanically and electrically connected to the other side end of the relay terminal 74. The voltage detection terminal 72 is a conductive flat plate bent into a substantially U-shape.

The distal end of one of flat surface portions extending from a bent turnaround portion along the same direction is used as a side of mechanical and electrical connection to the relay terminal 74. The distal end of the one side of the flat surface portions of the voltage detection terminal 72 is inserted into the relay terminal 74 from the female slot of the other side end of the relay terminal 74, and is pressed against the protrusions 74b in a state of being sandwiched and fixed between the protrusions 74b. Thus, the voltage detection terminal 72 is electrically connected to the relay terminal 74.

The side end of the other flat surface portion of voltage detection terminal 72 opposite to the turnaround portion is formed into a displaced and extending part that extends in the direction identical to the one of the flat surface portions and is outwardly displaced so as to be separated from the one of the flat surface portions by its thickness. The flat surface portion opposite to the one flat surface portion is formed as a mechanical and electrical connecting portion to the conductive pad 71c for the voltage detection terminal.

The relay terminal 74 and the voltage detection terminal 72 are supported and held by the insulator resin cover 73. The insulator resin cover 73 is a covering member that, above the battery module 110 at sides where the positive electrode external terminal 30 and the negative electrode external terminal 31 of the battery cell 10 protrude, is provided so as to airtightly cover a region of a part of the battery module 110 including the arrangement body of the positive electrode external terminals 30 and the negative electrode external terminals 31 disposed at one side end of the battery module 110 in the direction orthogonal to the arrangement direction of the battery cells 10, and a region outer than the one side end of the battery module 110 in the direction orthogonal to the arrangement direction of the battery cells 10, or the entire region of the battery module 110 at the side where the positive electrode external terminal 30 and the negative electrode external terminal 31 of the battery cell 10 protrude, and a region outer than the battery module 110. The insulator resin cover 73 includes a holding part 73a and a covering part 73b. The material of the insulator resin cover 73 may be a composite, or fiberglass reinforced plastics (FRP), prepared by mixing fibers such as glass fibers as reinforcement into electrically insulative thermosetting resin, such as unsaturated polyester, epoxy resin, polyamide resin and phenolic resin. The insulator resin cover 73 is a molded body manufactured by pouring the composite into a mold and curing the composite.

The holding part 73a is a structure having an L-shaped appearance and a substantially rectangular shape in a sectional view that extends along the arrangement direction of the battery cells 10 from the one side end to the other side end in the arrangement direction of the battery cells 10 outer than the one side end of the battery module 110 in the direction orthogonal to the arrangement direction of the battery cells 10 and is bent at a right angle at the other side end of the arrangement direction of the battery cells 10. The covering part 73b is a container having a rectangular parallelepiped shape extending in every direction from the edge of the flat surface (bottom surface) of the holding part 73a at the side of the battery module 110. That is, the insulator resin cover 73 is a member where the holding part 73a protrudes in a direction opposite to the battery module 110 from the flat surface opposite to the battery module 110 of the bottom surface of the covering part 73b that is the container having the rectangular parallelepiped shape open at the side of the battery module 110.

The relay terminal 74 and the voltage detection terminal 72 are insert molded into a solid portion of the holding part 73a on the side facing the battery modules 110 in the portion extending along the battery modules 10 such that the female slot at one side end of the relay terminal 74 is exposed and open at the bottom surface of the holding part 73a and the other side end of the relay terminal 74 vertically extends toward the top surface of the holding part 73a. A connector 75 is arranged at the solid portion of the portion of the holding part 73a bent at a right angle and extending at the side opposite to the other side end in the arrangement direction of the battery cells 10. The connector 75 is integrally molded with the insulator resin cover 73. Thus, the connector terminal 75a is insert molded into the holding part 73a.

The connector 75 may be a component separate from the insulator resin cover 73. In this case, an engagement holder for being engaged with the connector 75 and holding this is formed at the holding part 73a.

A groove (channel) 73c that is open at the bottom surface, has a rectangular shape in a sectional view and continuously extends along the appearance configuration of the holding part 73a from one side end of the holding part 73a to the other side end is formed so as to be adjacent to the solid portion, at each of a position opposite to the battery module 110 in the portion of the holding part 73a extending along the battery module 10 and a portion at the other side end in the arrangement direction of the battery cells 10 in a portion of the holding part 73a bent at a right angle and extending. The connecting portion of the voltage detection terminal 72 and the connecting portion of the connector terminal 75a of the connector 75 to be connected with the conductive pad 71d for the connector terminal are exposed at a wall surface of the groove 73c on the side of the solid portion.

The voltage detection line 71 is housed in the groove 73c of the holding part 73a such that the lateral direction of the voltage detection line 71 is the depth direction of the groove 73c, and positions of the conductive pad 71c for the voltage detection terminal and the connecting portion of the voltage detection terminal 72 are matched with each other and positions of the conductive pad 71d for the connector terminal and the connecting portion of the connector terminal 75a are matched with each other. The voltage detection line 71 is fixed at a position where the conductive pad 71c for the voltage detection terminal and the connecting portion of the voltage detection terminal 72 are contacted with each other by pressing with the U-shaped elastic member 76 for the voltage detection terminal from the opposite side of the contacting side, and also fixed at a position where the conductive pad 71d for the connector terminal and the connecting portion of the connector terminal 75a are contacted with each other by pressing with the U-shaped elastic member 77 for the connector terminal from the opposite side of the contacting side, while being pressed towards the wall surface of the groove 73c on the solid portion side.

As shown in FIG. 8, the U-shaped elastic member 76 for the voltage detection terminal is a U-shaped leaf spring (plate spring). Flat surface portions extend in the same direction from the bent turnaround portion of the U-shaped elastic member 76 for the voltage detection terminal. A hemispherical protrusion 76a is provided at a position corresponding to the conductive pad 71c for the voltage detection terminal of the flat surface at the side of the voltage detection line 71 at the distal end of the flat surface portion located at the side of the voltage detection line 71. The U-shaped elastic member 76 for the voltage detection terminal is inserted into the groove 73c from the side of the turnaround portion.

If the U-shaped elastic member 76 for the voltage detection terminal is inserted into the groove 73c, the conductive pad 71c for the voltage detection terminal contacted with the connecting portion of the voltage detection terminal 72, is pressed toward the connecting portion of the voltage detection terminal 72 from the side opposite to the connecting portion of the voltage detection terminal 72 by the protrusion 76a pressed toward the connecting portion of the voltage detection terminal 72 due to elastic force of the U-shaped elastic member 76 for the voltage detection terminal, and is pressed against the connecting portion of the voltage detection terminal 72. Accordingly, the conductive pad 71c for the voltage detection terminal and the connecting portion of the voltage detection terminal 72 are mechanically and electrically connected and thus conduct to each other.

The protrusion 76a of the U-shaped elastic member 76 for the voltage detection terminal is means for exerting an advantageous effect in terms of increasing contacting force between the connecting portion of the voltage detection terminal 72 and the conductive pad 71c for the voltage detection terminal and thereby reducing contact resistance therebetween.

As shown in FIG. 9, the U-shaped elastic member 77 for the connector terminal is a wide leaf spring (plate spring) into which six U-shaped leaf spring are integrated. Flat surface portions extend from the bent turnaround portion of the U-shaped elastic member 77 for the connector terminal in the same direction. The flat surface portion to be at the side of the connector terminal 75a is separated into six flat surface portions each opposing to the connector terminal 75a. The flat surface portion to be opposed to the side of the connector terminal 75a is a wide portion into which six flat surface portions are integrated. A hemispherical protrusion 77a is provided at a position on the surface facing the connector terminal 75a at the distal end of each of the six flat surface portions of the U-shaped elastic member 77 for the connector terminal at the side of the connector terminal 75a, the position corresponding to the conductive pad 71d for the connector terminal.

The U-shaped elastic member 77 for the connector terminal is inserted into the groove 73c from the turnaround portion side.

If the U-shaped elastic member 77 for the connector terminal is inserted into the groove 73c, the conductive pad 71d for the connector terminal contacted with the connecting portion of the connector terminal 75a is pressed toward the connecting portion of the connector terminal 75a from the side opposite to the connecting portion of the connector terminal 75a by the protrusion 77a pressed toward the connecting portion of the connector terminal 75a due to elastic force of the U-shaped elastic member 77 for the connector terminal, and pressed against the connecting portion of the connector terminal 75a. Accordingly, both of the conductive pad 71d for the connector terminal and the connecting portion of the connector terminal 75a are mechanically and electrically connected and thus conduct to each other.

The protrusion 77a of the U-shaped elastic member 77 for the connector terminal is means exerting an advantageous effect in terms of increasing contacting force between the connecting portion of the connector terminal 75a and the conductive pad 71d for the connector terminal and thereby reducing contact resistance therebetween.

A through hole 73d having a diameter larger than the outer diameter of the flange of the positive electrode external terminal 30 and the negative electrode external terminal 31 of the battery cell 10 is formed at a position on the side of the battery module 110 in the covering part 73b opposite to the positive electrode external terminal 30 and the negative electrode external terminal 31 of the battery cell 10. The through hole 73d functions as an operational window for engaging the bus bar 60 integrated with the voltage detection line unit 70 with the positive electrode external terminal 30 and the negative electrode external terminal 31 of the battery cell 10, and fixing the engaged bus bar 60 to the positive electrode external terminal 30 and the negative electrode external terminal 31 by a fixation nut 80.

A flange nut including a flange having the outer diameter substantially identical to the outer diameter of the flange of the positive electrode external terminal 30 and the negative electrode external terminal 31 of the battery cell 10 is adopted as the fixation nut 80. However, a normal nut without a flange may be adopted instead. Another fixation method, such as welding and solder joint, may be adopted instead of using the fixation nut 80.

The through hole 73d is airtightly sealed by a sealing plug 81 after the bus bar 60 is attached and fixed. This allows the sealed space formed by the insulator resin cover 73 to be airtightly secured. The sealing plug 81 is a rubber cap formed by integrating a disk-shaped lid and a circular toroidal portion vertically protruding from a surface opposing to the through hole 73d of the lid. The outer diameter of the toroidal portion of the sealing plug 81 is larger than the inner diameter of the through hole 73d such that the inner surface of the through hole 73d and the outer surface of the toroidal portion are intimately contacted with each other.

Engagement structures for positioning the insulator resin cover 73 and the battery module 110, such as a pin, and a hole into which the pin is inserted at least two positions, which are not shown, between the insulator resin cover 73 and the battery module 110. This structure facilitates the positioning of the insulator resin cover 73 with respect to the battery module 110 when the battery module 110 is assembled, thereby allowing assembly workability of the battery module 110 to be improved. The engagement structure arranged between the insulator resin cover 73 and the battery module 110 can function as a supporting post for holding the insulator resin cover 73 on the battery module 110. The supporting posts are further arranged at the plurality of places.

Next, referring to FIG. 10, a procedure for attaching the voltage detection line unit 70 will be described among procedures for assembling the battery module 110.

First, the voltage detection line unit 70 is preliminarily produced before assembling the battery module 110.

To begin with, the voltage detection terminal 72, the relay terminal 74 and the connector terminal 75a are insert molded. The voltage detection line 71 is inserted into the groove 73c of the holding part 73a of the insulator resin cover 73 integrally formed with the connector 75. The U-shaped elastic member 76 for the voltage detection terminal and the U-shaped elastic member 77 for the connector terminal are also respectively inserted thereinto. Accordingly, the voltage detection line 71 is fixed to the holding part 73a; the conductive pad 71c for the voltage detection terminal is pressed against the connecting portion of the voltage detection terminal 72; the conductive pad 71d for the connector terminal is pressed against the connecting portion of the connector terminal 75a.

Next, the bus bar terminal 61 of the bus bar 60 is inserted into the relay terminal 74. Accordingly, the voltage detection line unit 70 integrally including the bus bar 60 is manufactured.

In this embodiment, the description is made using the example of insert molding the relay terminal 74 into the insulator resin cover 73. Instead, after the voltage detection line 71 is fixed to the insulator resin cover 73 by the U-shaped elastic member 76 for the voltage detection terminal and the U-shaped elastic member 77 for the connector terminal, the relay terminal 74 may be inserted into the insulator resin cover 73, the voltage detection terminal 72 may be mechanically and electrically connected thereto, and subsequently the bus bar terminal 61 of the bus bar 60 may be inserted into the relay terminal 74.

Next, the twelve battery cells 10 are arranged in a row, and the arrangement body is fixed.

Next, the preliminarily prepared insulator resin cover 73 as described above is positioned with respect to the battery module 110 and attached thereto via an engagement mechanism provided between the insulator resin cover 73 and the battery module 110. Accordingly, the bus bar 60 is engaged with the positive electrode external terminal 30 on one battery cell 10 and the negative electrode external terminal 31 on the other battery cell 10 to be electrically connected to each other.

Next, the fixation nut 80 is screwed with the positive electrode external terminal 30 on the one battery cell 10 and the negative electrode external terminal 31 on the other s battery cell 10 to be electrically connected to each other, via the through hole 73*d*, thereby fixing the bus bar 60. Accordingly, the bus bar 60 is fixed to the battery cell 10, while the voltage detection line 71 is electrically connected to the battery cell 10.

Lastly, the sealing plug 81 is inserted into the through hole 73*d*, and seals the through hole 73*d*. This completes the attachment of the voltage detection line unit 70.

According to the voltage detection line unit 70 of the this embodiment described above, in the procedure for assembling the battery module 110, the bus bar 60 is mechanically connected to the battery cell 10, while the voltage detection line 71 is electrically connected to the battery cell 10. Thus, operation of connecting the voltage detection line 71 to the battery cell 10 in the procedure for assembling the battery module 110 is omitted. This enables the assembly workability of the battery module 110 to be improved. Accordingly, in this embodiment, the procedure for assembling the battery module 110 can be simplified, thereby enabling the manufacturing cost of the battery module 110 to be reduced. Therefore, this embodiment can reduce the cost of the battery module 110.

This embodiment employs the insertable relay terminal 74 for mechanical and electrical connection between the bus bar terminal 61 of the bus bar 60 and the voltage detection terminal 72. This negates the need of joining, such as welding, complicating workability, thereby enabling manufacturability of the voltage detection line unit 70 to be improved.

Further, this embodiment employs the voltage detecting conductors 71*b* printed on the flexible printed circuit board 71*a* as the voltage detection line 71. This improves handling, and facilitates downsizing and reduction in weight. Moreover, this allows manufacturability of the voltage detection line unit 70 to be improved, and further facilitates downsizing and reduction in weight.

Moreover, this embodiment employs the voltage detecting conductors 71*b* printed on the flexible printed circuit board 71*a* as the voltage detection line 71. This allows the fuses 71*e* to be integrally provided for the voltage detection line 71. Accordingly, even in case where abnormal current flows from the battery cell 10, the voltage detection line 71 can immediately be broken. Accordingly, this embodiment allows the cell controller 120 to be protected from the abnormal current from the battery cell 10, and enables reliability and safety of the battery device 100 to be improved. Further, in this embodiment, the fuse 71*e* is integrally provided for the voltage detection line 71. This allows an operation of connecting the fuse to be omitted in the procedure for assembling the battery module 110, thereby enabling an advantageous effect in reduction of manufacturing cost of the battery module 110 due to simplification of the procedure for assembling the battery module 110 to be enhanced.

Moreover, this embodiment employs the U-shaped elastic member 76 for the voltage detection terminal and the U-shaped elastic member 77 for the connector terminal for connection between the voltage detection line 71, the voltage detection terminal 72 and the connector terminal 75. This negates the need of joining, such as welding, complicating workability, thereby enabling manufacturability of the voltage detection line unit 110 to be improved. Further, this embodiment employs the U-shaped elastic member 76 for the voltage detection terminal and the U-shaped elastic member 77 for the connector terminal for connection between the voltage detection line 71, voltage detection terminal 72 and the connector terminal 75. This enables the voltage detection line 71 to be replaceable, and allows the entire components of the voltage detection line unit 70 to be reusable except for the voltage detection line 71. Accordingly, this embodiment is excellent in replaceability of components, recyclability and environmentality, and facilitates reduction in cost of the battery module 110.

Second Embodiment

Figure 11:
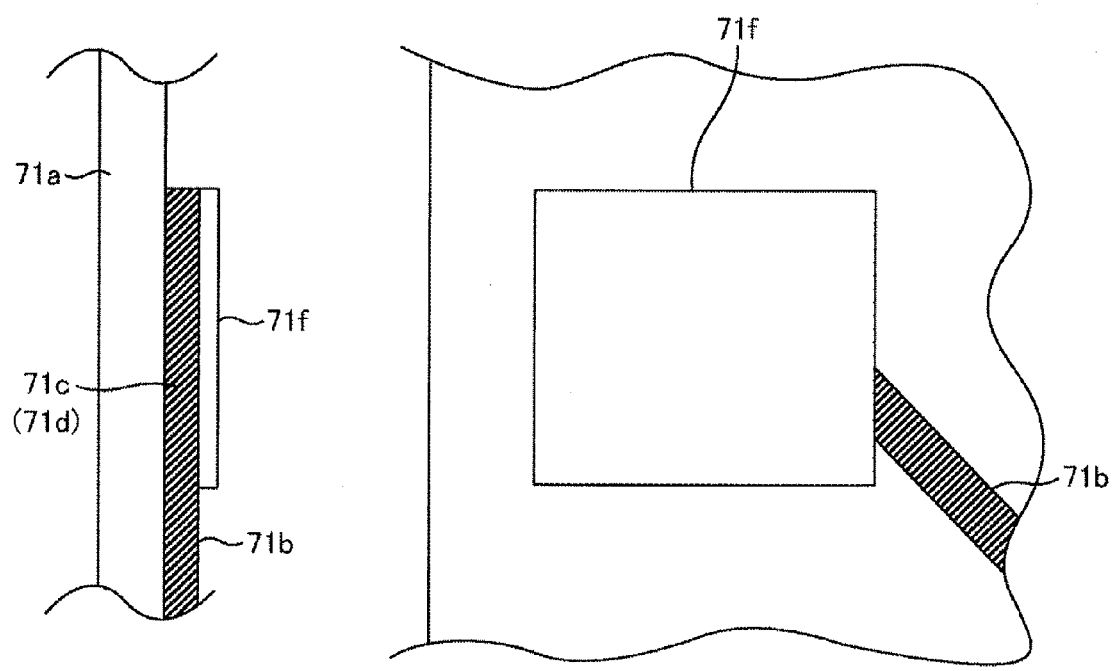
FIG. 11 is an enlarged view showing by enlarging a configuration of an electrode pad part of a flexible printed circuit board adopted in a voltage detection line unit of a battery module (embodiment 2).

A second embodiment will be described on the basis of FIG. 11.

The second embodiment is an example of an improvement of the first embodiment, and different in configuration of the voltage detection line 71 from the first embodiment. The other configurations are identical to those of the first embodiment. Accordingly, the configuration identical to that of the first embodiment is assigned with symbols identical to that of the first embodiment, and the description thereof is omitted.

In the second embodiment, conductivity improving material 71*f* is printed or applied on surfaces of the conductive pad 71*c* for the voltage detection terminal and the conductive pad 71*d* for the connector terminal. Any one of gold plate, silver palladium plate, silver plate, tin plate, and conductive adhesive is used as the conductivity improving material 71*f*. However, any types of material having conductivity analogous to them may be employed instead.

This embodiment exerts advantageous effects analogous to those of the first embodiment, and further, because of printing and application of the conductivity improving material 71*f* on the conductive pad 71*c* for the voltage detection terminal and the conductive pad 71*d* for the connector terminal, allows preferable electrical connection between the connecting portion of the voltage detection terminal 72 and the conductive pad 71*c* for the voltage detection terminal and between the connecting portion of the connector terminal 75*a* and the conductive pad 71*d* for the connector terminal. That is, the contact resistance therebetween can further be reduced, thereby accuracy in detection of voltage of the battery cell 10 to be improved.

Third Embodiment

Figure 12:
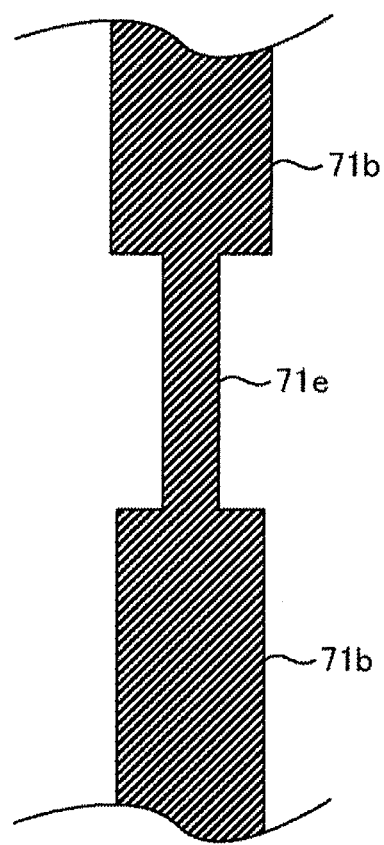
FIG. 12 is an enlarged view showing by enlarging a configuration of a conductive wiring part of a flexible printed circuit board adopted in a voltage detection line unit of a battery module (embodiment 3).

A third embodiment will be described on the basis of FIG. 12.

The third embodiment is an example of a variation of the first embodiment, and different in configuration of the voltage detection line 71 from the first embodiment. The other configurations are identical to those of the first embodiment. Accordingly, the configuration identical to that of the first embodiment is assigned with symbols identical to that of the first embodiment, and the description thereof is omitted.

In the first embodiment, the fuse 71*e* is a component separate from the voltage detecting conductor 71*b*. However, in the third embodiment, the voltage detecting conductor 71*b* is configured narrowly in width than the other portions, thereby increasing current density at a portion in the voltage detecting conductor 71*b* corresponding to the fuse. According to this configuration, in case where the current density of the portion in the voltage detecting conductor 71*b* corresponding to the fuse becomes greater than the current density of the rated current, the portion in the voltage detecting conductor 71*b* corresponding to the fuse melts and opens, thereby breaking the voltage detecting conductor 71*b*.

This embodiment can exert advantageous effects analogous to those of the first embodiment.

The above described embodiments are examples, and various modifications can be made without departing from the scope of the invention.

What is claimed is:

1. An electrical storage module, comprising:
a plurality of electrical storage units;
electrical storage unit connecting conductors electrically connecting the plurality of electrical storage units; and
a voltage detection line unit electrically connected to the plurality of electrical storage units for detecting a voltage of each of the plurality of the electrical storage units, wherein:
the voltage detection line unit is unitized with the electrical storage unit connecting conductors, includes voltage detection lines for each detecting the voltage of one of the plurality of the electrical storage units, and is configured such that, when the electrical storage unit connecting conductors are mechanically connected to the plurality of electrical storage units, the voltage detection lines are electrically connected to the electrical storage units, wherein
the voltage detection lines unit include a circuit board provided with the voltage detection lines, connection terminals electrically connected to the electrical storage unit connecting conductors, a holding member holding the connection terminals, and an elastic member fixing the circuit board by pressing the circuit board against the holding member,
one of the voltage detection lines is contacted with one of the connection terminals, and is pressed against the one of the connection terminals by a portion of the circuit board corresponding to a contacting portion being pressed by the elastic member, and wherein the elastic member is U-shaped and when viewed in cross-section, a length of the cavity corresponds to a length of: i) the at least one of the voltage detection lines, and ii) both legs of the U-shaped elastic member.

2. An electrical storage module, comprising:
a plurality of electrical storage units;
electrical storage unit connecting conductors electrically connecting the plurality of electrical storage units; and
a voltage detection line unit electrically connected to the plurality of electrical storage units for detecting a voltage of each of the plurality of the electrical storage units, wherein
the voltage detection line unit is unitized with the electrical storage unit connecting conductors, includes voltage detection lines for each detecting the voltage of one of the plurality of the electrical storage units, and is configured such that, when the electrical storage unit connecting conductors are mechanically connected to the plurality of electrical storage units, the voltage detection lines are electrically connected to the electrical storage units,
the voltage detection line unit includes a circuit board provided with the voltage detection lines, connection terminals electrically connected to the electrical storage unit connecting conductors, a holding member holding the connection terminals, and an elastic member fixing the circuit board by pressing the circuit board against the holding member,
the voltage detection line unit defines a cavity within which at least one of the voltage detection lines and the elastic member are disposed, and wherein the elastic member is U-shaped and when viewed in cross-section, a length of the cavity corresponds to a length of: i) the at least one of the voltage detection lines, and ii) both legs of the U-shaped elastic member.

3. The electrical storage module according to claim 2, wherein
the U-shaped elastic member has a hemispherical protrusion in only one leg thereof, the hemispherical protrusion extending toward the one of the voltage detection lines.

4. The electrical storage module according to claim 3, wherein when viewed in cross-section, one of the inner walls of the cavity includes an insulated surface and a conducting surface, and the at least one of the voltage detection lines is pressed into contact with both the insulated surface and the conducting surface.

5. The electrical storage module according to claim 4, wherein when viewed in cross-section, a majority of one of the legs of the U-shaped elastic member is separated from the at least one of the voltage detection lines by a dead air space, and a majority of the other of the legs of the U-shaped elastic member is in contact with a second of the inner walls of the cavity.

6. The electrical storage module according to claim 2, wherein one of the voltage detection lines is contacted with one of the connection terminals, and is pressed against the one of the connection terminals by a portion of the circuit board corresponding to a contacting portion being pressed by the elastic member.

7. The electrical storage module according to claim 6, wherein the circuit board is a flexible printed circuit board configured by arranging the voltage detection lines having a foil-like form on a flexible material.

8. The electrical storage module according to claim 7, wherein the flexible material is polyimide.

9. The electrical storage module according to claim 6, wherein
the circuit board is provided with an output portion for outputting a voltage from the voltage detection line unit;
the output portion is provided with a connector including connector terminals; and
the connector terminals are electrically connected with the voltage detection lines at a side thereof opposite to a side pressed against the connection terminals.

10. The electrical storage module according to claim 9, wherein:
the voltage detection lines at the side opposite to the side pressed against the connection terminals and the connector terminals are electrically connected to each other by contacting the voltage detection lines at the side opposite to the side pressed against the connection terminals with the connector terminals, pressing the circuit board corresponding to a contacting portion by the elastic member, and pressing the voltage detection lines at the side opposite to the side pressed against the connection terminals against the connector terminals.

11. The electrical storage module according to claim 6, wherein:
a fuse mechanism that melts and opens one of the voltage detection lines due to electrical current flowing through the one of the voltage detection lines is provided at a portion of the one of the voltage detection lines adjacent to one of the connection terminals.

12. The electrical storage module according to claim 11, wherein:
the fuse mechanism is configured by forming the portion of the one of the voltage detection lines more narrowly in width than remaining portions.

13. An electrical storage module, comprising:
a plurality of electrical storage units;
electrical storage unit connecting conductors electrically connecting the plurality of electrical storage units;
voltage detection lines electrically connected to the plurality of electrical storage units configured to detect a voltage of each of the plurality of electrical storage units;
a circuit board provided with the voltage detection lines; and
a voltage detection line unit that electrically connects electrical storage unit connecting conductor terminals provided on the electrical storage unit connecting conductors and the voltage detection lines of the circuit board, wherein:
the voltage detection line unit is configured as a relay unit that is mechanically connected to the electrical storage unit connecting conductor terminals, and
the voltage detection line unit includes relay terminals mechanically connected to the electrical storage unit connecting conductor terminals, a holding member holding the relay terminals, and an elastic member fixing the circuit board by pressing the circuit board against the holding member and pressing the voltage detection lines contacted with the relay terminals against the relay terminals, and wherein the elastic member is U-shaped and when viewed in cross-section, a length of a cavity within which at least one of the voltage detection lines and the elastic member are disposed corresponds to a length of: i) the at least one of the voltage detection lines, and ii) both legs of the U-shaped elastic member.

* * * * *